United States Patent
Carroscia

(10) Patent No.: US 7,309,038 B2
(45) Date of Patent: Dec. 18, 2007

(54) ENDLESS WIRE CONTAINER AND METHOD OF USING THE SAME

(75) Inventor: Michael A. Carroscia, Newbury, OH (US)

(73) Assignee: Lincoln Global, Inc., City of Industry, CA (US)

( * ) Notice: Subject to any disclaimer, the term of this patent is extended or adjusted under 35 U.S.C. 154(b) by 425 days.

(21) Appl. No.: 11/140,387

(22) Filed: May 27, 2005

(65) Prior Publication Data
US 2006/0278747 A1 Dec. 14, 2006

(51) Int. Cl.
B65H 18/28 (2006.01)

(52) U.S. Cl. ............... 242/170; 242/129; 242/171; 242/172; 206/389; 206/397; 206/407; 206/408; 206/409

(58) Field of Classification Search ............ 242/170, 242/171, 172, 129; 206/389, 397, 407, 408, 206/409
See application file for complete search history.

(56) References Cited

U.S. PATENT DOCUMENTS

| | | | |
|---|---|---|---|
| 2,880,305 A | 3/1959 | Baird | |
| 5,553,810 A | 9/1996 | Bobeczko | |
| 5,739,704 A | 4/1998 | Clark | |
| 5,746,380 A | 5/1998 | Chung | |
| 5,819,934 A | 10/1998 | Cooper | |
| 5,971,308 A | 10/1999 | Boulton | |
| 6,019,303 A | 2/2000 | Cooper | |
| 7,220,942 B2* | 5/2007 | Barton et al. ............ | 219/137.2 |
| 2004/0155090 A1 | 8/2004 | Jensen | |

FOREIGN PATENT DOCUMENTS

JP 59-229287 12/1984

* cited by examiner

*Primary Examiner*—John Q. Nguyen
(74) *Attorney, Agent, or Firm*—Fay Sharpe LLP

(57) ABSTRACT

A container for packaging and unwinding a coil of welding wire to allow an uninterrupted flow of the welding wire from one the container to another container. The coil of welding wire, including a coiled portion having a top and a bottom, a first extension of wire extending from the coil near the coil top to a feeding end and a second extension of wire extending from the coil near the bottom to a transfer end. The transfer end of one container being joinable to the feeding end of another container. The container including an outer packaging having at least one vertically extending sidewall, a closed bottom, a top opening for removing the welding wire and a wire coil receiving cavity within the outer packaging for receiving the wire coil. The feeding end and the transfer end can be positionable near the top opening. The container further includes at least one transfer control tab in the cavity near the top opening. The at least one tab is configured to selectively support the transfer end of the wire during the unwinding of the wire from the coil and to selectively release the transfer end during the transfer from the one container to the other container.

66 Claims, 16 Drawing Sheets

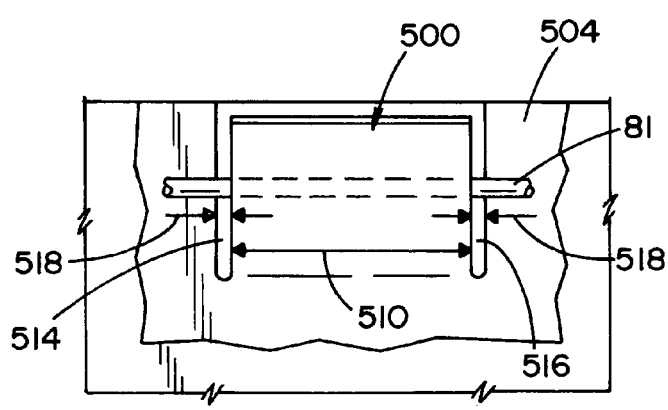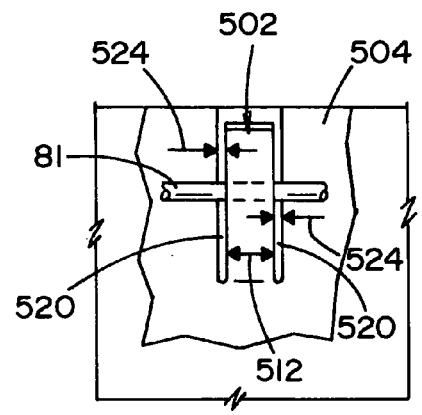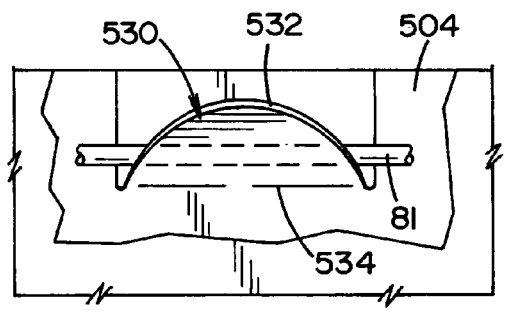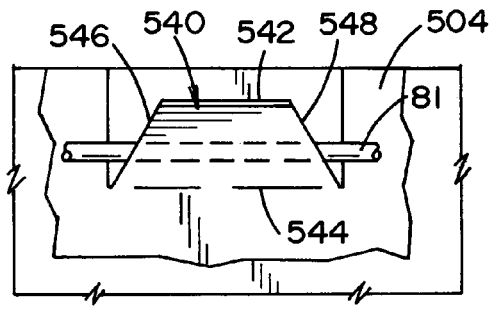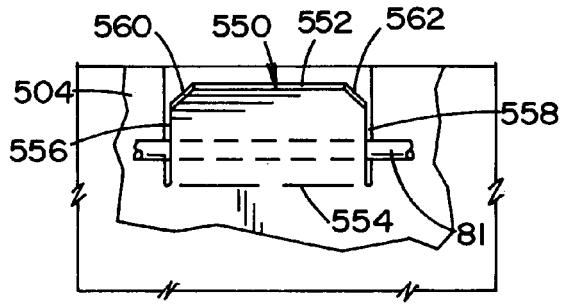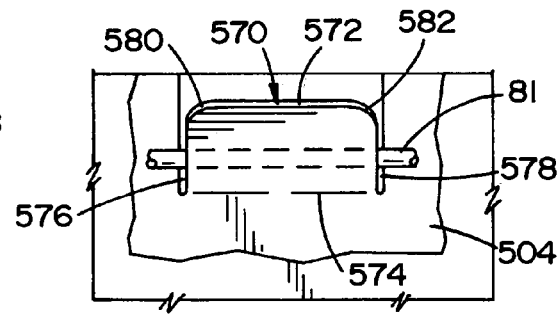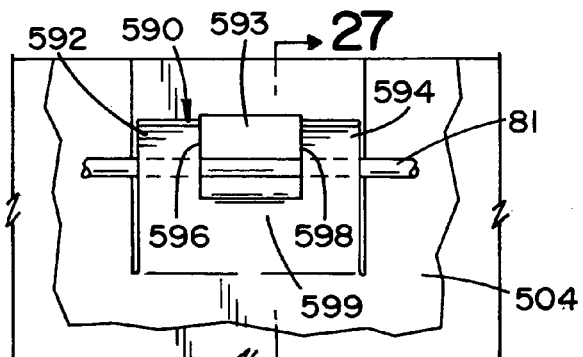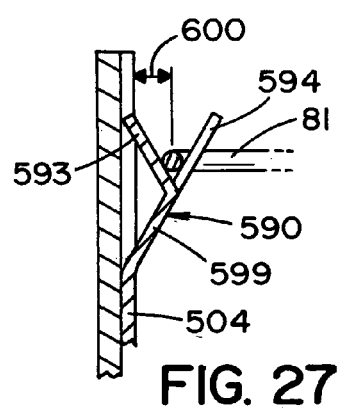

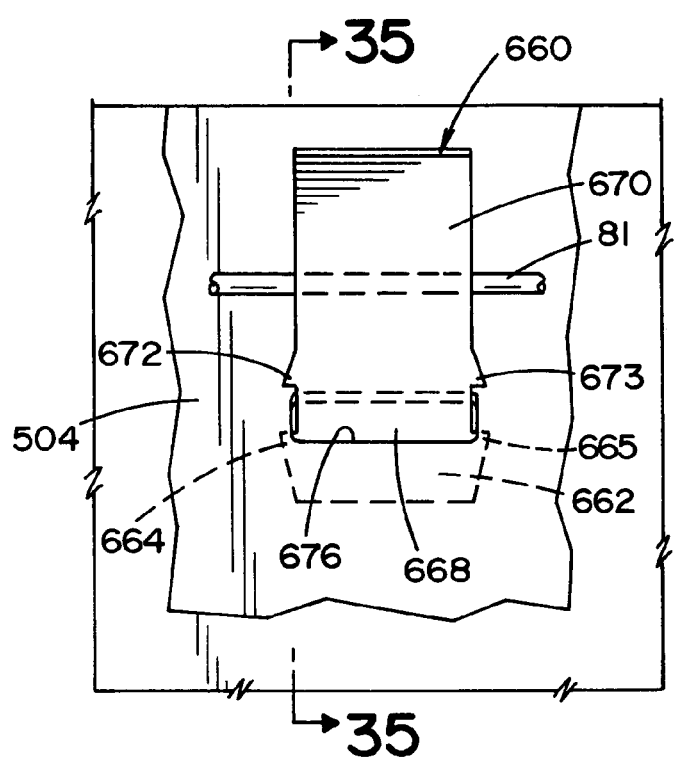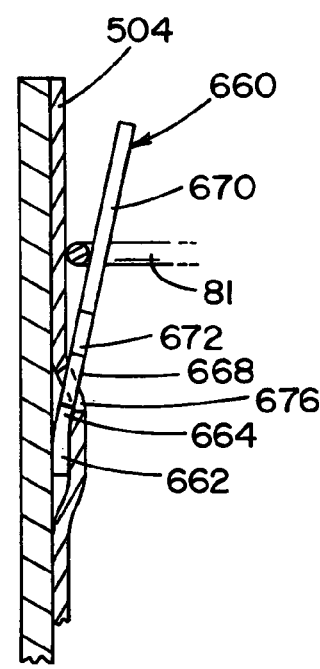
FIG. 34
FIG. 35

ENDLESS WIRE CONTAINER AND METHOD OF USING THE SAME

The present invention relates to welding wire packaging and more particularly to welding wire package for use as an endless wire container such that the welding wire of multiple containers can be linked together to produce an uninterrupted flow of welding wire to a welding operation.

INCORPORATION BY REFERENCE

Welding wire used in high production operations, such as robotic welding stations, is provided in a large package having over 200 pounds of wire. The welding wire, in these packages, is looped into convolutions of wire loops forming a wire coil extending around a central core or a central clearance bore. One such winding technique is shown in Cooper U.S. Pat. No. 6,019,303, which discloses a method and apparatus for packing wire in a storage drum and which is incorporated by reference herein as background material showing the same.

However, even the use of large packaging does not eliminate down-time for the welding operation when the welding wire of the packaging or container is exhausted. Even if a new container of welding wire is staged for a quick changeover, the welding wire from the new container must be threaded through the feeding apparatuses and to the welding torch. As can appreciated, this can cause significant downtime, especially for welding operations that consume a large quantity of welding wire. Accordingly, it has been proposed to butt welding the trailing end of the welding wire from one container to the leading end of the welding wire from another container. However, it has been found that an e-script condition is created in the welding wire when the transfer takes place from an exhausted container to the next full container. Jensen 2004/0155090 discloses such an endless wire arrangement and is incorporated by reference herein as background material showing the same.

As can be appreciated, any apparatus and/or arrangement that is used for endless wire containers needs to function with other components of the welding wire container such that an uninterrupted flow of welding wire to the welding operation is achieved. To control the transportation and payout of the wire, an upper retainer or braking device, such as a braking ring, can be used to help control the unwinding of the wire from the wire coil. One such package is shown in Cooper U.S. Pat. No. 5,819,934 which discloses a welding wire drum that utilizes a braking ring to control the unwinding of the welding wire from the wire coil. Cooper U.S. Pat. No. 5,819,934 is also incorporated by reference herein as background material showing the same. Another such packaging is shown in Chung U.S. Pat. No. 5,746,380, which also discloses a welding wire drum; however, Chung discloses a different wire flow controlling apparatus for controlling the payout of the welding wire from the drum. Chung is also incorporated by reference herein for showing the same.

BACKGROUND OF INVENTION

In the welding industry, tremendous numbers of robotic welding stations are operable to draw welding wire from a package as a continuous supply of wire to perform successive welding operations. The advent of this mass use of electric welding wire has created a need for large packages for containing and dispensing large quantities of welding wire. However, as can be appreciated, there is a limit to the size of the welding wire package. If the packages or containers are too large, they become difficult to transport and are very costly. These can be factors if the container is damaged. In addition, the container consumes a large portion of floor space near the welding operation. As a result, even when large containers of welding wire are utilized, downtime is inevitable when the wire is exhausted from the container. While quick changeover techniques can be utilized to replace the exhausted container with a new container of welding wire, the welding operation is shut down. In view of the new high-tech and costly robotic welding systems, a short downtime can be very costly. This is especially true in multiple robotic welding production lines that utilize several robotic welding operations. As can be appreciated, a single offline robotic welder can result in several robotic welding systems being forced offline.

In order to reduce downtime, attempts have been made to link the welding wire from one container to the welding wire of another container. Theoretically, if welding wire containers can be joined to one another, an "endless wire" welding wire supply can be produced, wherein a welding operation is never shut down due to an exhausted wire container. While this theory is sound, the practicality of achieving an endless wire without tangling the welding wire is a different matter. As can be appreciated, a tangled welding wire can be an even worse condition than an exhausted container of welding wire and can create greater amounts of downtime. Accordingly, in order to achieve an endless wire container, tangling needs to be eliminated, or at least made a rare occurrence.

A large capacity welding wire container typically includes an outer container, such as a drum, with welding wire looped about a central, vertical axis to form a wire coil. The coil has a top surface with an outer cylindrical surface that is supported by the outer packaging and an inner cylindrical surface defining a central bore coaxial to the central, vertical axis. The central bore can be occupied by a cardboard, cylindrical core, as is shown in Cooper U.S. Pat. No. 5,819,934.

Jensen discloses an endless wire arrangement used in connection with octagonal welding wire containers. With reference to FIGS. 1C and 1D, Jensen further discusses the e-script condition that results when the welding wire from one container is joined to the welding wire of another container. As is stated above, the welding wire is wound into the container such that it extends about a vertically extending central axis. Further, the winding process can be used to produce a natural cast in the wire, creating upward spring forces in the coil and an outward force in the coil. As the wire is exhausted in the one container, the last remaining loop rises in the container and folds over itself to produce the e-script tangle. As can be appreciated, the e-script tangle forces the operation to be shut down so that the e-script can be removed.

Jensen attempts to overcome the e-script problem with a large, bulbous runner 11. The runner is configured to interfere with the formation of the e-script by being positionable at the formation point of the e-script. However, the runner disclosed in Jensen has many flaws. First, as is shown in FIG. 2, runner 11 is shaped and sized such that it can fall into the retainer ring Ref: 4, whereby the runner can become lodged below the retainer ring. Further, the weight of the runner can negatively produce significant downward force in the welding wire when the first container is exhausted. This is especially true since the runner disclosed in Jensen has a central passage configuration that prevents the runner from being removed from the welding wire without cutting the welding wire or destroying the runner. For these reasons and other reasons, the Jensen device fails to effectively overcome the natural problems with creating an endless wire system.

In order to work in connection with the wire feeder of the welder, the welding wire must be dispensed in a non-twisted, non-distorted and non-canted condition, which produces a more uniform weld without human attention. It is well known that wire has a tendency to seek a predetermined natural condition which can adversely affect the welding process. Accordingly, the wire must be sufficiently controlled by the interaction between the welding wire package and the wire feeder. To help in this respect, the manufacturers of welding wire produce a wire having natural cast, wherein, if a segment of the wire was laid on the floor, the natural shape of the wire would be essentially a straight line; however, in order to package large quantities of the wire, the wire is coiled into the package, which can produce a significant amount of wire distortion and tangling as the wire is dispensed from the package. As a result, it is important to control the payout of the wire from the package in order to reduce twisting, tangling or canting of the welding wire. This condition is worsened with larger welding wire packages which are favored in automated or semi-automated welding.

The payout portion of the welding wire package helps control the outflow of the welding wire from the package without introducing additional distortions in the welding wire to ensure the desired continuous smooth flow of welding wire. Both tangling or breaking of the welding wire can cause significant downtime while the damaged wire is removed and the wire is re-fed into the wire feeder. In this respect, when the welding wire is payed out of the welding wire package, it is important that the memory or natural cast of the wire be controlled so that the wire does not tangle. The memory or natural cast of the wire causes a constant force in the convolutions of wire which is directed outwardly such that the diameter of the convolutions is under the influence of force to widen. The walls of the wire welding package prevent such widening. However, when the welding wire is payed out of the package, the walls of the package lose their influence on the wire, and the wire is forced toward its natural cast. This causes the portion of the wire which is being withdrawn from the package to loosen and tend to spring back into the package, thereby interfering and possibly becoming tangled with other convolutions of wire. In addition to the natural cast, the wire can have a certain amount of twist, which causes the convolutions of welding wire in the coil to spring upwardly.

The payout device, braking devices or retainer ring are positioned on the top of the coil and forced downwardly against the natural springing effect of the welding wire. The downward force is either the result of the weight of the retainer ring or a separate force-producing member, such as an elastic band connected between the retainer ring and the bottom of the package. The wire is directed through the retainer ring in a designated manner to control its outward flow. With respect to the downward force of the ring, the optimal downward force during the shipment of the package is different than the optimal downward force for the payout of the welding wire. Accordingly, while elastic bands or other straps are utilized to maintain the position of the payout or retainer ring during shipping, the weight of the retainer ring can be used to maintain the position of the payout relative to the wire coils during the payout of the wire. However, the braking device must descend within the package as the wire is unwound from the wire coil.

As can be appreciated, it is preferred that any device utilized to transform a welding wire container into an endless wire system should be capable of functioning with existing welding wire technology and new welding wire technology. In this respect, and is as discussed above, braking devices or rings are utilized to control the unwinding of the wire from the wire coil. It is important that the wire be controlled to minimize tangling or any other form of interruption of flow of the welding wire. These braking devices have evolved over the years, and devices such as is disclosed in Cooper have been found to be effective. Therefore, the ability to utilize existing brake ring technology is an advantage.

The welding wire can also be controlled by other mechanisms such as the packaged beads, as is shown in Chung. The packaged beads along with pressing pipes help control the out flowing welding wire as it exits the wire drum. Again, endless wire systems configured to work with existing technologies that have been proven to provide tangle-free wire dispensing is an advantage.

STATEMENT OF INVENTION

In accordance with the present invention, provided is a container for packaging and unwinding a coil of welding wire to allow an uninterrupted flow of the welding wire from one container to another container.

More particularly, the container houses a coil of welding wire including a coiled portion having a top and a bottom, a first extension of the wire extending from the coil near the coil top to a feeding end and a second extension of the wire extending from the coil near the coil bottom to a transfer end. The transfer end of the one container being joinable to the feeding end of another container. The container can include an outer packaging with at least one vertically extending sidewall, a closed bottom, a top opening for removing the welding wire and a wire coil-receiving cavity within the outer packaging for receiving the wire coil. The feeding end and the transfer end are positionable near the top opening to allow easy access to both.

The container further includes at least one transfer control tab in the cavity near the top opening. The at least one tab can be configured to selectively support the transfer end of the wire during the unwinding of the wire from the coil and configured to selectively release the transfer end during the transfer from the one container to the other container.

BRIEF DESCRIPTION OF DRAWINGS

The foregoing, and more will, in part, be obvious and, in part, be pointed out more fully hereinafter, in conjunction with a written description of preferred embodiments of the present invention illustrated in the accompanying drawings in which:

FIG. 20 is an enlarged elevational view of another embodiment of the present invention which includes tabs with a wide rectangular configuration;

FIG. 21 is an enlarged elevational view of a yet another embodiment of the present invention which includes tabs with a narrow rectangular configuration;

FIG. 22 is an enlarged elevational view of a further embodiment of the present invention which includes tabs with an arcuate top edge;

FIG. 23 is an enlarged elevational view of yet a further embodiment of the present invention which includes tabs with a trapezoidal configuration;

FIG. 24 is an enlarged elevational view of another embodiment of the present invention which includes tabs with a rectangular configuration and angled top edge portions;

FIG. 25 is an enlarged elevational view of yet another embodiment of the present invention which includes tabs with a rectangular configuration and arcuate top edge portions;

FIG. 26 is an enlarged elevational view of a further embodiment of the present invention which includes tabs with a rectangular configuration and multiple flaps;

FIG. 27 is an enlarged sectional view taken along lines 27-27 in FIG. 26;

FIG. 34 is an enlarged elevational view of yet another embodiment of the present invention which includes tabs that are secured in a slot formed in a component of the container;

FIG. 35 is an enlarged sectional view taken along lines 35-35 in FIG. 34;

DESCRIPTION OF PREFERRED EMBODIMENTS

Figure 1:
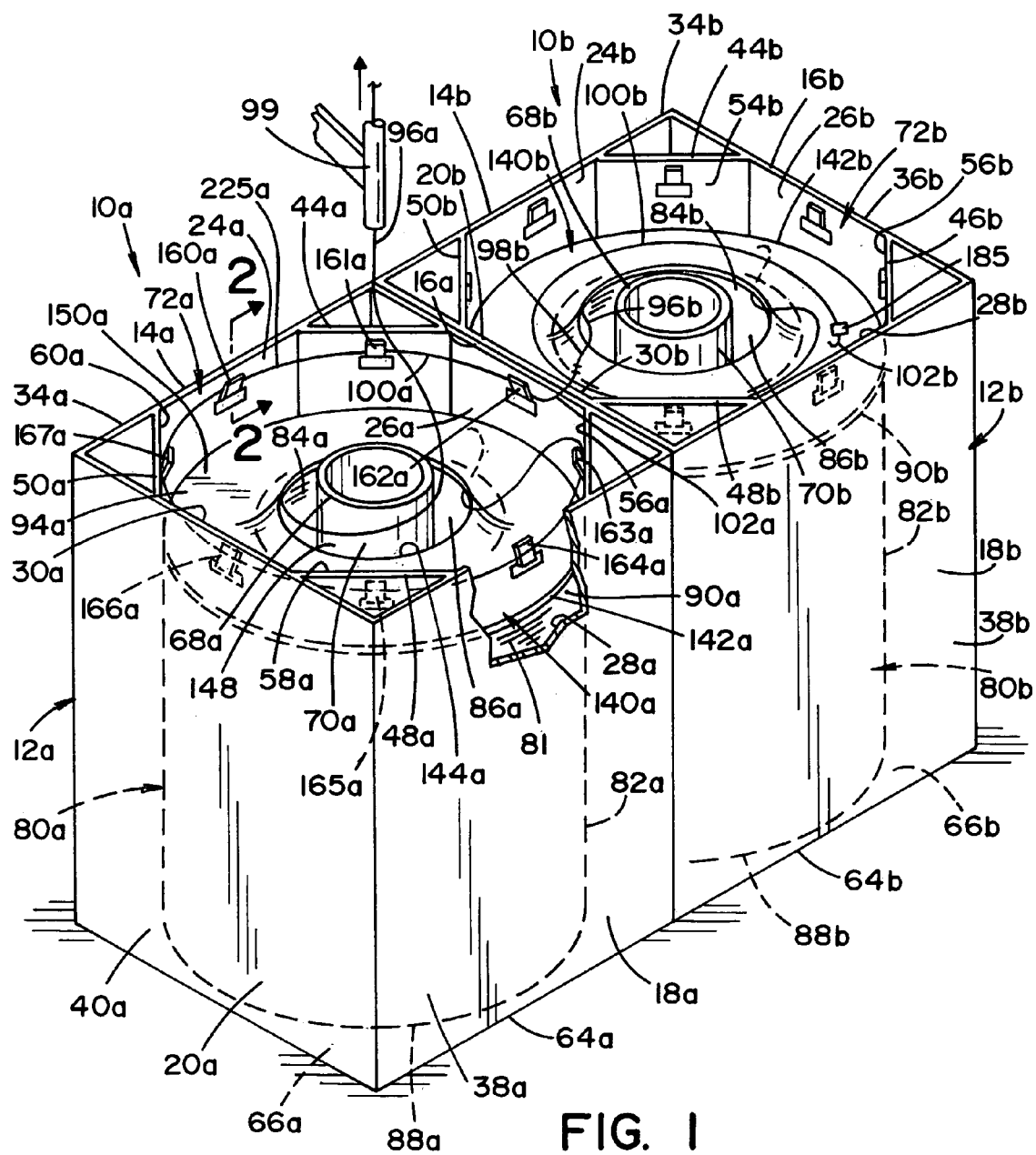
FIG. 1 is a top, side perspective view of a first and a second container according to the present invention which are joined to one another and which are both in a full condition.
Figure 2:
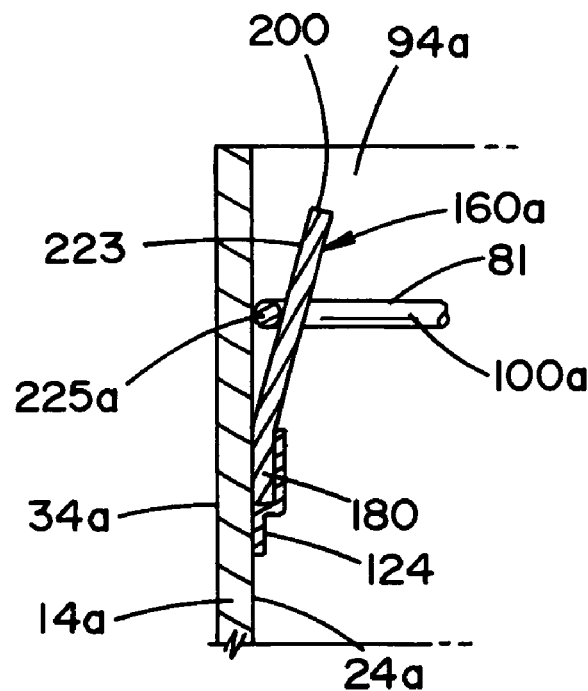
FIG. 2 is an enlarged sectional view taken along lines 2-2 in FIG. 1.
Figure 3:
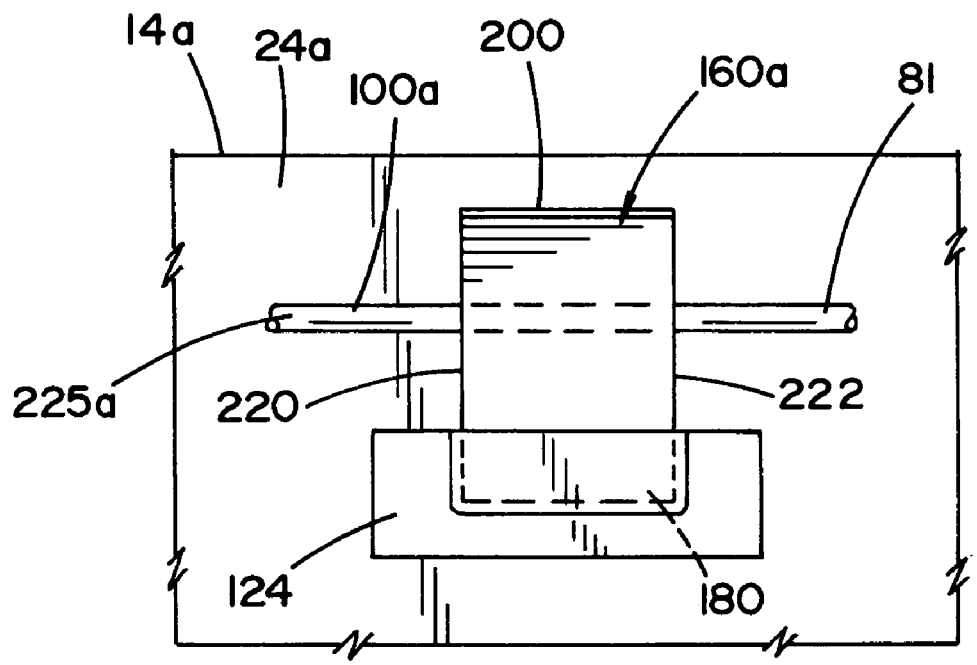
FIG. 3 is an enlarged elevational view of the tab shown in FIG. 2 which is secured by a single strip of a single-sided adhesive material.
Figure 4:
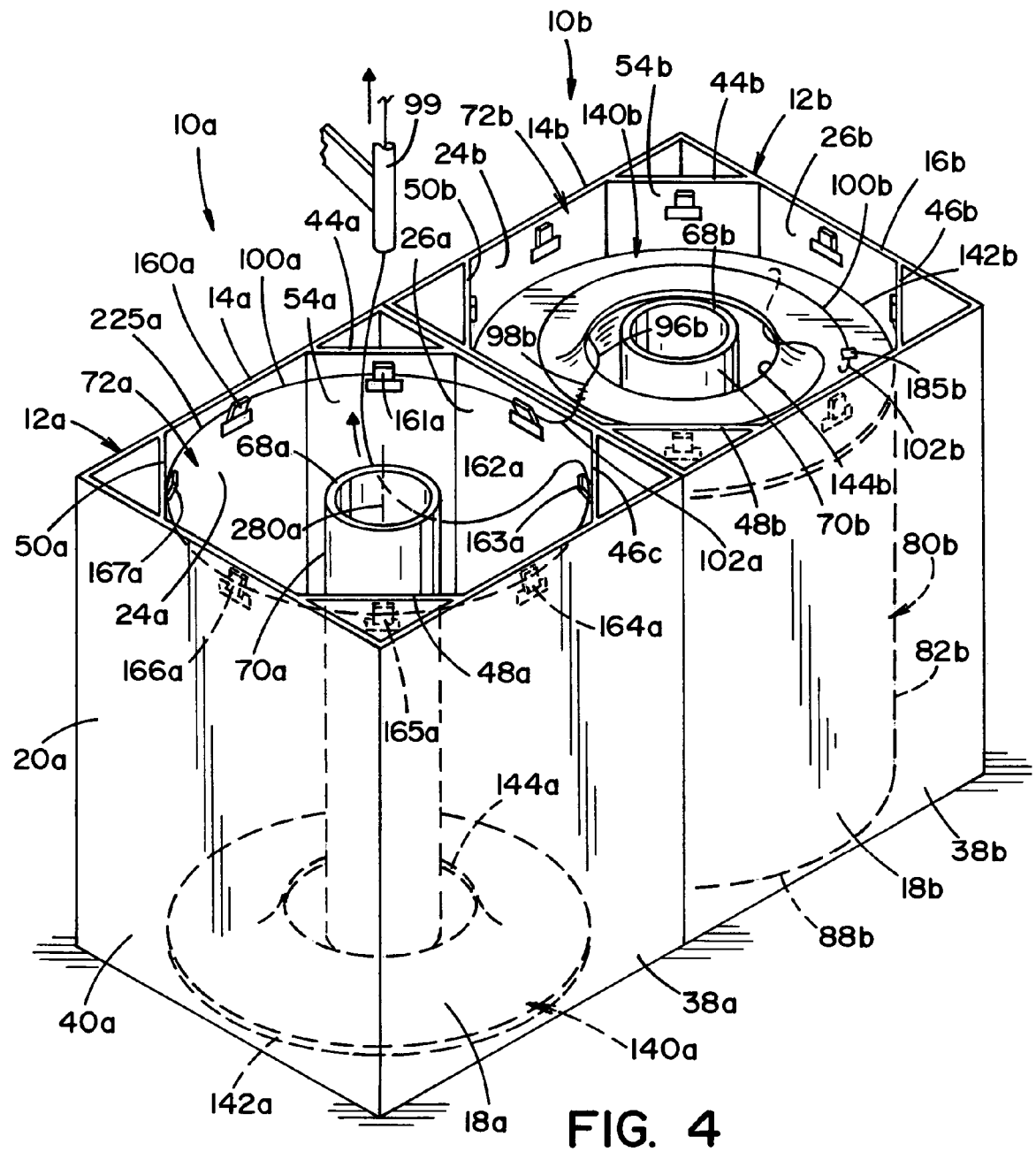
FIG. 4 is a top, side perspective view of the two containers shown in FIG. 1 wherein one container is in an exhausted condition with all tabs still engaging the welding wire.
Figure 5:
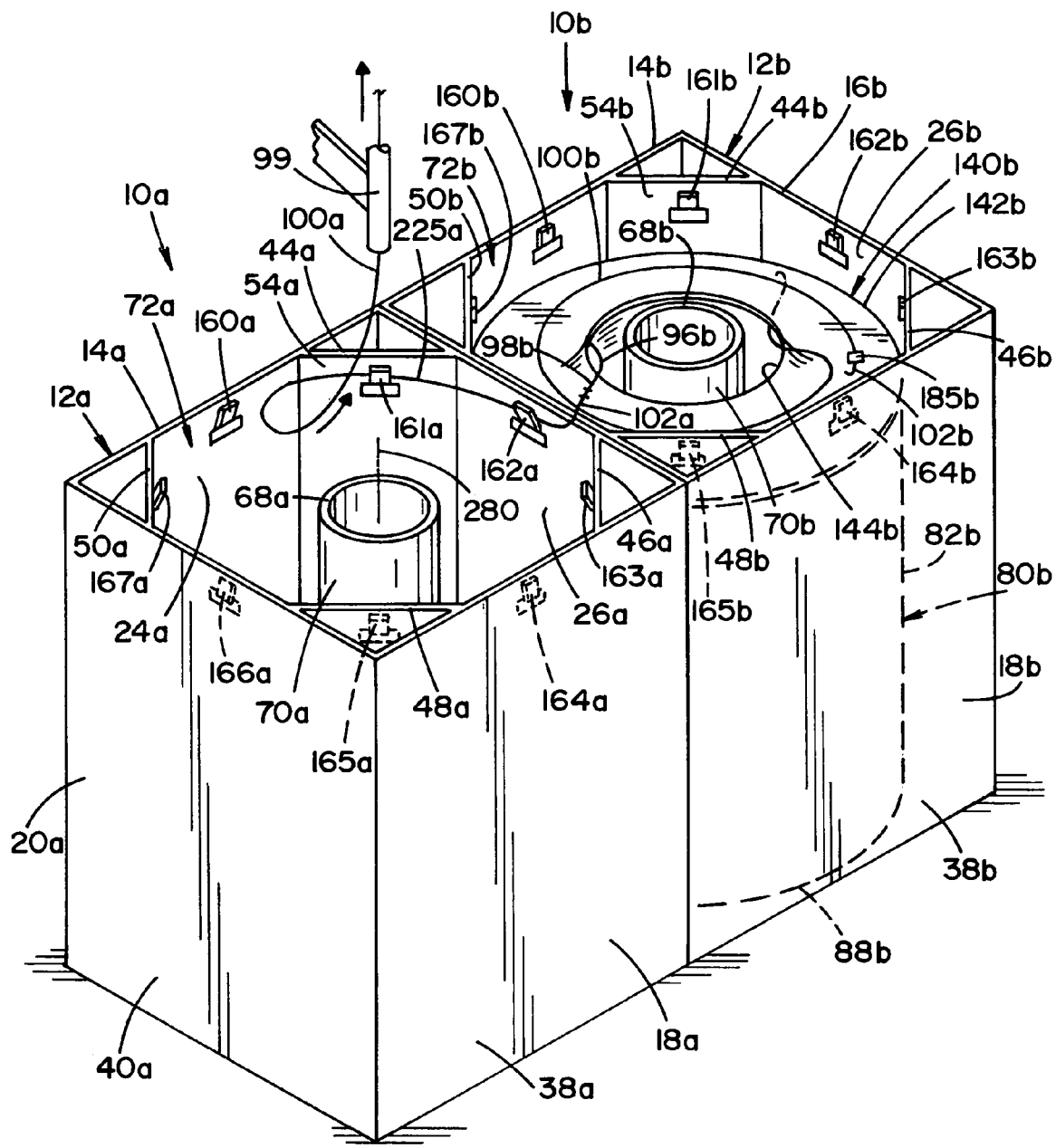
FIG. 5 is a top, side perspective view of the two containers shown in FIG. 1 wherein one container is in an exhausted condition with the last two tabs still engaging the welding wire.
Figure 6:
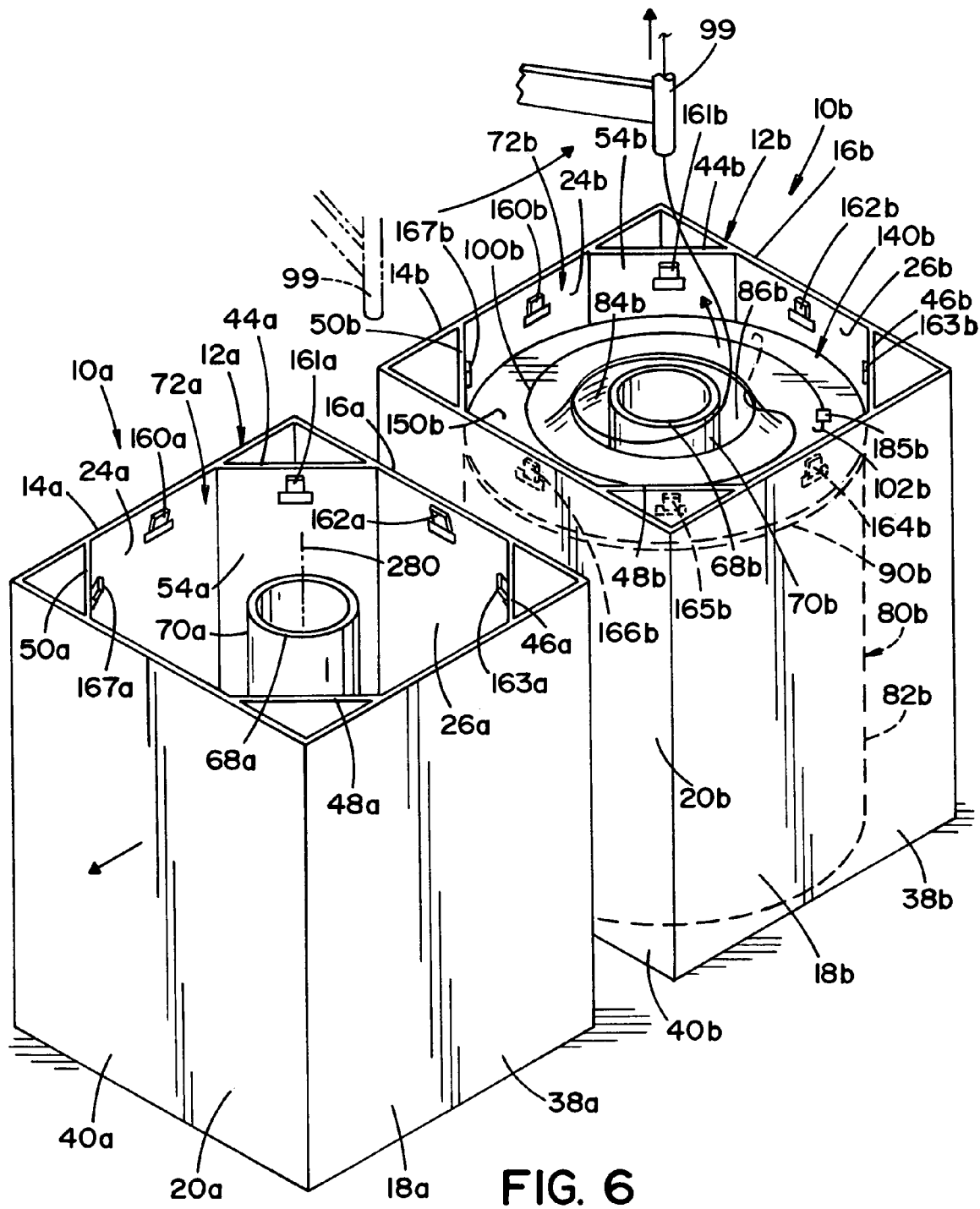
FIG. 6 is a top, side perspective view of the containers shown in FIG. 1 wherein the changeover to the second container is complete.
Figure 7:
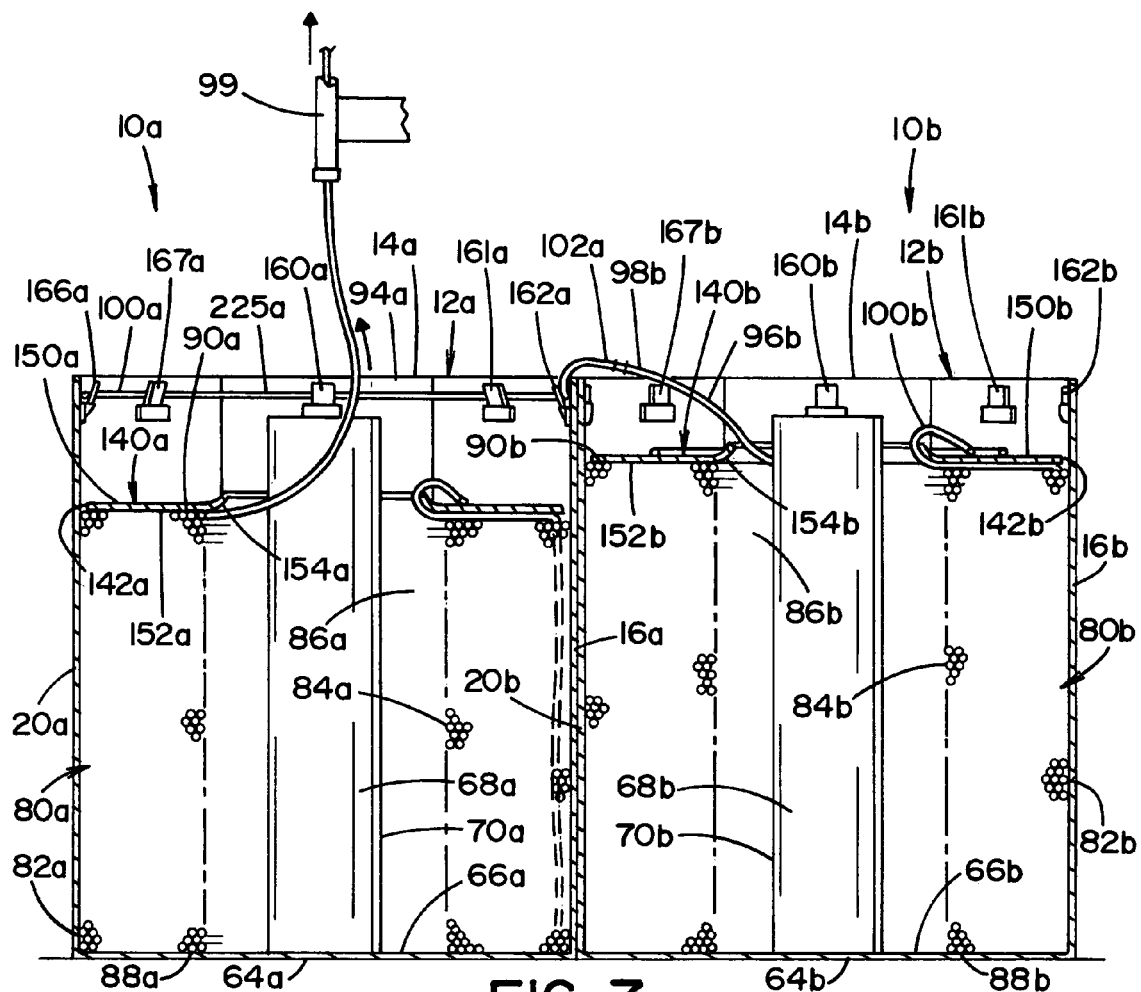
FIG. 7 is a sectioned, side sectional view of the containers shown in FIG. 1 with some wire removed from one container.
Figure 8:
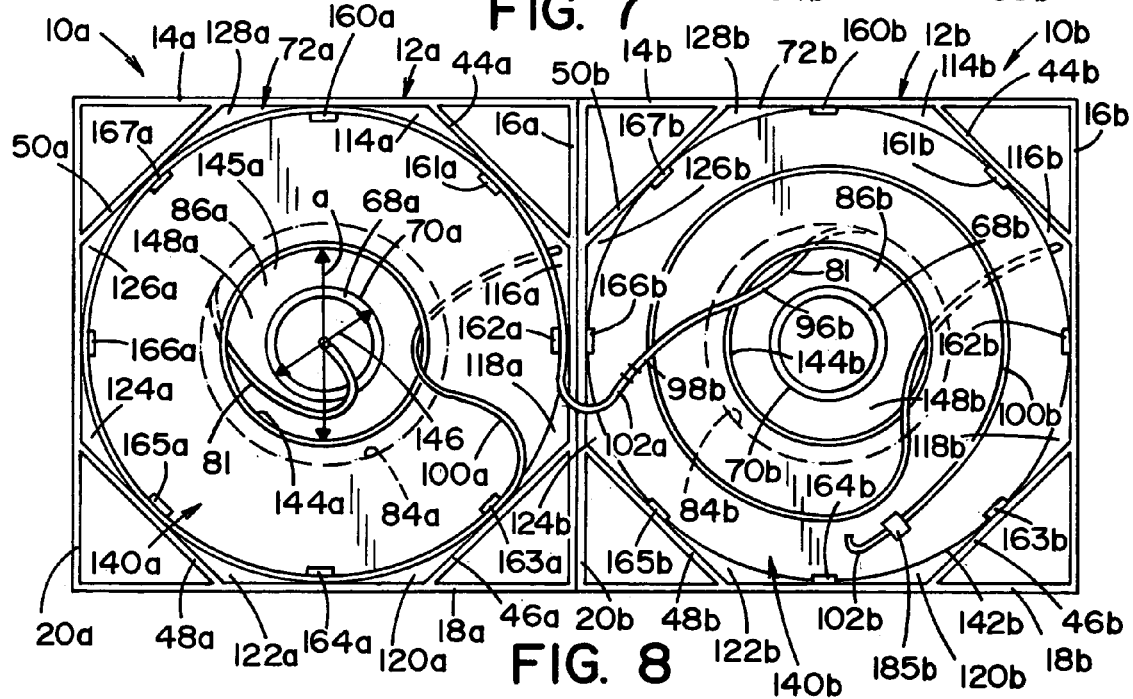
FIG. 8 is a top plan view of the containers shown in FIG. 1.
Figure 9:
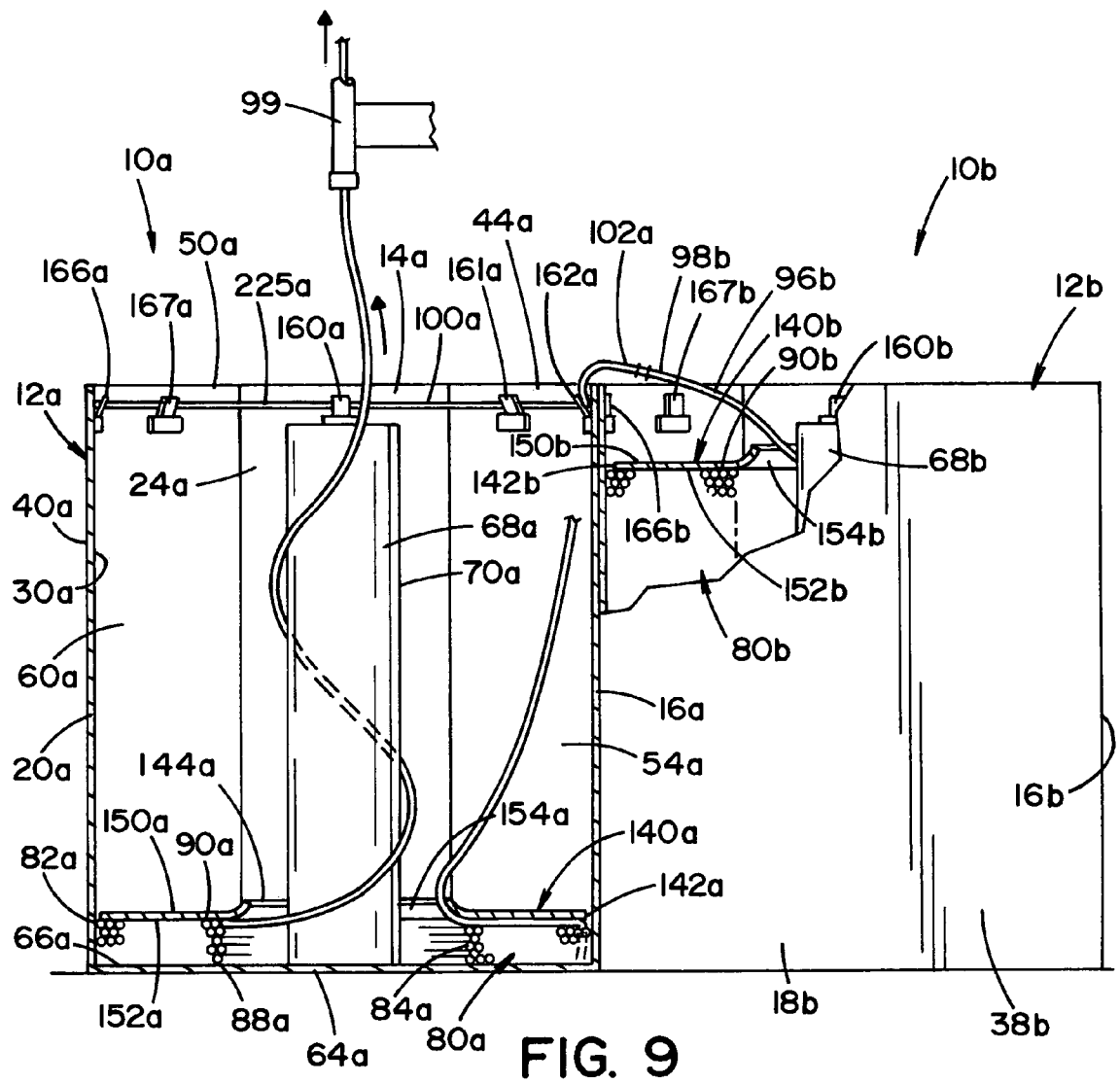
FIG. 9 is a side elevational view, partially sectioned, of the containers shown in FIG. 1 wherein the majority of the welding wire has been removed from one of the containers.
Figure 10:
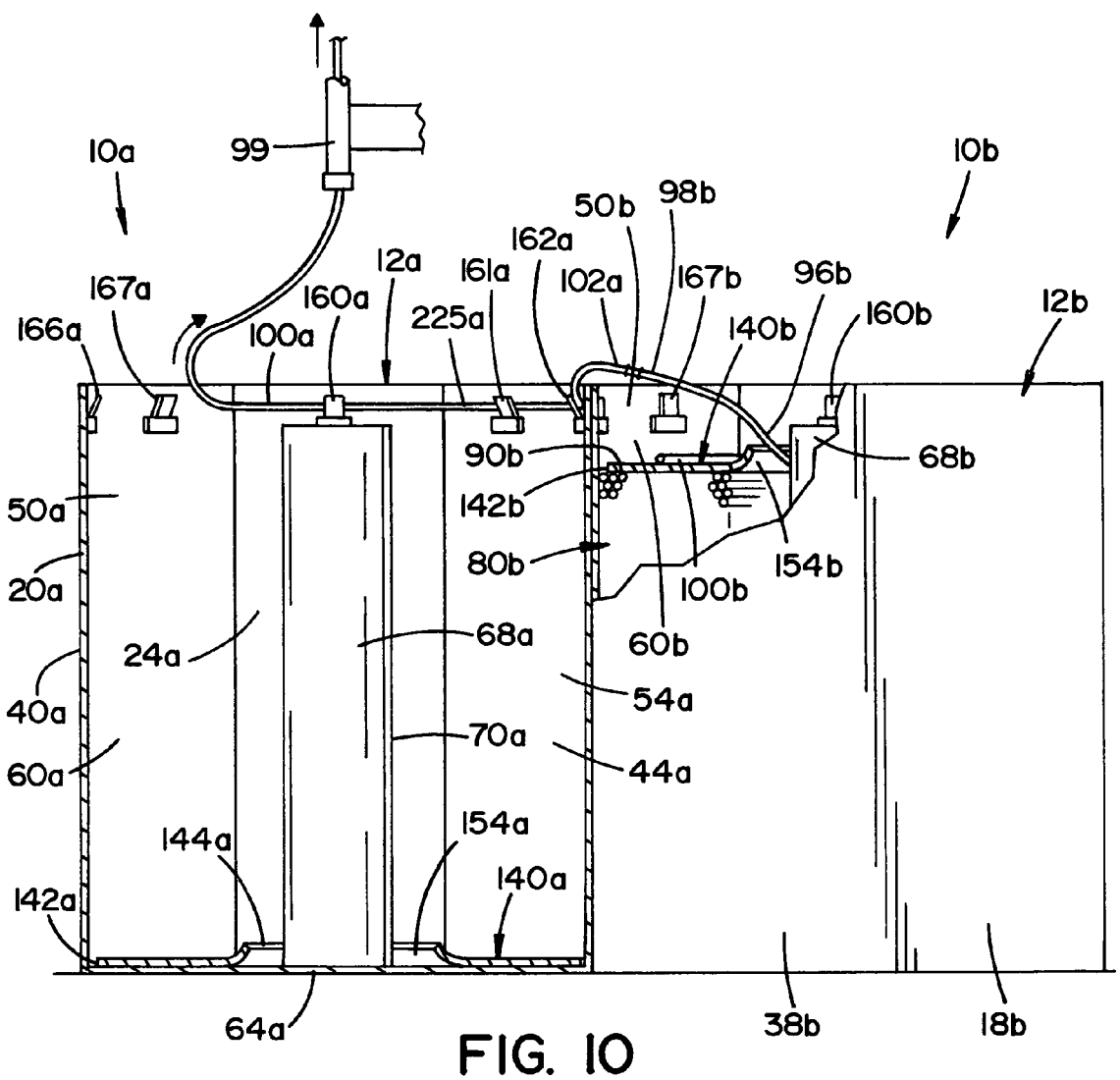
FIG. 10 is a side elevational view, partially sectioned, of the containers shown in FIG. 1 partially through the transfer to the second container.

Referring now in greater detail to the drawing wherein the showings are for the purpose of illustrating preferred embodiments of the invention only, and not for the purpose of limiting the invention, FIGS. 1-10 show containers 10a and 10b which are side-by-side one another in an uninterrupted flow arrangement. While square packaging designs with liners are primarily shown and discussed in this application, the invention of this application has much broader applications and can be used with a wide range of welding wire packages including, but not limited to, welding wire drums and square containers without liners which will be, at least partially, discussed below. Further, containers 10a and 10b are shown to be virtually identical containers. Again, the use of identical containers is also not a requirement for this application. For example, a drum style container could be used side-by-side with a box style container without detracting from the invention of this application.

Again, for the simplification of the disclosure, containers 10a and 10b are the same style container and, therefore, common reference numbers will be used for both containers and will be distinguished from each other with the reference letter "a" for package 10a and "b" for package 10b. Again, this application is not to be limited to identical or even similar packaging configuration for the containers that are joined together for uninterrupted wire flow. Further, since both containers are the same, the below discussion concerning container 10a also applies to container 10b and no "a" or "b" designation will be provided unless necessary for clarity. In addition, and for simplification, a detailed discussion of package 10b is not provided, since it is shown to be the same as container 10a.

Container 10a is the first in line of the two containers and includes an outer container or packaging 12, which, as stated above, is a square container, having sides 14, 16, 18 and 20, with inner surfaces 24, 26, 28 and 30, respectively, and outer surfaces 34, 36, 38 and 40. The container further includes corner supports 44, 46, 48 and 50 having inner surfaces 54, 56, 58 and 60, respectively. Container 10a further includes a closed bottom 64 which can, as with the other box components, be any known closed bottom in the art including, but not limited to, bottom flaps extending from the sidewalls. Container 10a can further include a base sheet 66 and an inner core 68 having a radially outwardly facing surface 70. Base sheet 66 can be a separate independent component placed in container 10 or can be a portion of closed bottom 64. In this respect, closed bottom 64 can have a number of flap configurations including, but not limited to, a partial flap extending from each sidewall, a full flap extending from each sidewall or flaps extending from only some (such as two) sidewalls. In configurations such as half flaps extending from all four sidewalls, base sheet 66 can be the inner two flaps of the four-flap arrangement and can be configured to be free of damaging objects such as staples. As can be appreciated, an additional base sheet could be used even with this four-flap arrangement.

Inner surfaces 24, 26, 28 and 30 along with surfaces 54, 56, 58 and 60, in this embodiment, form an outer extent of a wire receiving cavity 72. The inner extent of wire-receiving cavity 72, in this particular box arrangement, is defined by surface 70 of core 68, and the bottom extent is defined by base sheet 66. A wire coil 80 is wound from a welding wire 81 into cavity 72 by any known means in the art, including techniques designed to create the desired cant or natural cast. After the wire is wound into coil 80, it includes a radially outward surface 82 supported by surfaces 24, 54, 26, 56, 28, 58, 30 and 60. Coil 80 further includes a radially inward surface 84 defining a cylindrical central open section 86 in the wire coil. Essentially, coil 80 has an annular configuration extending from a bottom 88 resting on base sheet 66 to a top 90 near a top container opening 94.

Coil 80 further includes a first wire extension 96 extending between coil 80 near top 90 and a feeding end 98. Coil 80 also includes a second extension 100 extending from wire coil 80 from near bottom 88 to a transfer end 102. The feeding end can be fed through a wire guide 99 to a welding operation (not shown). Second extension 100 is positioned such that it extends from near bottom 88 across the bottom of the coil and then up radial outward surface 82, such that the second extension is positioned between radial outward surface 82 and one of surfaces 24, 54, 26, 56, 28, 58, 30 and 60. However, in connection with a square container configuration including the disclosed octagonal wire cavity, the second extension can extend upwardly through one of the gaps produced between the coil and the packaging. In this respect, container 10 further includes wire cavity gaps 114, 116, 118, 120, 122, 124, 126 and 128. Accordingly, second extension 100 can extend through one of these gaps including gap 116, as is shown in the drawings.

Container 10 can further include a braking or retainer ring 140 to help control the unwinding of the welding wire from the coil as the wire is fed to the welding operation. Retainer ring 140 is known in the art and is disclosed in Cooper U.S. Pat. No. 5,819,934. However, as can be appreciated, the invention of this application can be used in connection with any known braking ring beyond the ring shown in Cooper U.S. Pat. No. 5,819,934. Further, other unwinding control arrangements can be used without detracting from the invention of this application. Ring 140, as shown, includes an outer peripheral surface or edge 142 and an inner edge 144. Outer peripheral edge 142 is sized and configured to allow the braking ring to freely descend within the wire cavity and to prevent convolutions of the welding wire from springing upwardly between the outer periphery and surfaces 24, 54, 26, 56, 28, 58, 30 and 60. As is known in the art, peripheral edge 142 can be circular or can include projecting lobes to increase the ability of the ring to prevent the unwanted upward springing of the welding wire. Inner edge 144 can be circular forming a ring opening 145 with a diameter "a" that is greater than a diameter 146 of core 68 to produce a wire feeding gap 148 between the inner edge of the ring and the inner core surface. The wire feeding gap will be discussed in greater detail below. Ring 140 can further include a top surface 150 and a bottom surface 152 that can at least partially rest on coil top 90. Ring 140 can further include a wire guiding curved surface 154 to prevent unwanted damage to the welding wire as it passes through wire feeding gap 148 toward top opening 94.

Container 10 further includes transfer control tabs 160, 161, 162, 163, 164, 165, 166 and 167 positioned in wire cavity 72. In this embodiment, tabs 160-167 all have a common configuration and, therefore, will be discussed in greater detail in relation to tab 160 and FIGS. 2 and 3. In this respect, tabs 160-167 are rectangular tabs having a tab base 180, a top edge 200 a first side edge 220 and a second side edge 222. The side edges can extend from the respective bases to the respective top edges of each tab. In this particular embodiment, the tabs are rectangular and are joined to the walls and the corner supports by a single adhesive strip 124. The tabs further include a radially outward surface 223. As will be discussed in greater detail below, other methods can be used to form the tabs in the cavity. With respect to the positioning of the tabs, tab 160 is joined to wall 14, tab 161 is joined to corner support 44, tab 162 is joined to wall 16, tab 163 is joined to corner support 46, tab 164 is joined to wall 18, tab 165 is joined to corner support 48, tab 166 is joined to wall 20, and tab 167 is joined to corner support 50. Further, while eight tabs are shown, more tabs or fewer tabs can be used without detracting from the invention of this application.

The tabs are shown to be rectangular tabs that are attached to the respective container surface. However, as will be discussed in greater detail below, the tabs can have other configurations and other structures. Further, as will also be discussed in greater detail below, the tabs can be formed from a particular package component such as by slitting the package component to form the side edges and/or top edges of the tabs or can be a separate component joined to the particular component.

The tabs are preferably upwardly opened tabs or structures that allow the upward release of the wire in a controlled fashion. Tabs 160-167 can pivot about respective horizontal tabs bases 180 to selectively support and release the welding wire, which will be discussed in greater detail below. Further, tabs 160-167 can be positioned near top opening 94 opening to better control the wire as the last convolution of wire exits the wire cavity. However, the top edges of the tabs do not need to be even with the top edge of the container to function. The top edges of the tabs can be offset above or below the top edge of the package without detracting from the invention of this application, which will also be discussed in greater detail below.

Tabs 160-167 are configured to selectively support a portion of the welding wire and, in particular, a portion of extension 100. However, as is shown in the figures, transfer end itself does not need to be supported by the tabs. During operation, tabs 160-167 are to selectively release the supported portion of wire during the transfer from container 10a to 10b. In greater detail, extension 100, as is discussed above, extends from the coil bottom up the side of the coil to the coil top and passes between coil top 90 and ring 140 through ring opening 145. Extension 100 can be secured to a portion of the container, such as to the top of ring 140 by, for example, an adhesive strip 185, for the transport of the wire container which is shown on package 10b. If uninterrupted flow is desire, extension 100 can be, at any time, positioned in tabs 160-167.

In this particular arrangement (FIG. 1), extension 100 can be released from its transport position and, based on the orientation of packages 10a and 10b to one another, can be positioned in the tabs. First, the extension is oriented from ring opening toward tab 163 on corner support 46. The extension is positioned between tab 163 and corner support 46, such that the wire of the extension is supported by the frictional engagement between a radially outward surface 223 of tab 163 and corner support surface 54; next, extension 100 is oriented from tab 163 toward tab 164 on wall 18 and is supported by the frictional engagement between a radially outward surface 223 of tab 164 and wall surface 28; then, from tab 164 to tab 165 on corner support 48 and is supported by the frictional engagement between a radially outward surface 223 of tab 165 and corner support surface 58; then, from tab 165 to tab 166 on wall 20 and is supported by the frictional engagement between a radially outward surface 223 of tab 166 and wall surface 30; then, from tab 166 to tab 167 on corner support 50 and is supported by the frictional engagement between a radially outward surface 223 of tab 167 and corner support surface 60; then, from tab 167 to tab 160 on wall 14 and is supported by the frictional engagement between a radially outward surface 223 of tab 160 and wall surface 24; then, from tab 160 to tab 161 on corner support 44 and is supported by the frictional engagement between a radially outward surface 223 of tab 161 and corner support surface 54; then, from tab 161 to tab 162 on wall 16 and is supported by the frictional engagement between a radially outward surface 223 of tab 162 and wall surface 26; then the wire or extension is oriented toward container 10b wherein transfer end 102a of extension 100a is joined to feeding end 98b of first extension 96b. However, it should be noted that the ends could be joined before the extension is positioned in the tabs. Essentially, the portion of extension 100 that is suspended by the tabs forms a last or tab convolution 225.

The function of tabs 160-167 is to prevent, or at least greatly reduce, the formation of an e-script or tangle in the welding wire as the supply of welding wire is transferred from container 10a to container 10b. More particularly, as the wire is being consumed from container 10a, wire passes from coil 80a past brake ring 140a toward feeding implement 99. As can be appreciated, the removal of welding wire from coil 80a reduces the remaining coil within passage 10a wherein coil top 90a descends within wire cavity 72. Braking ring 140 follows this descent and continues to control the unwinding of welding wire 81a from wire coil 80a (see FIGS. 7 & 9). At the point when the remaining wire is removed from underneath the braking ring, a portion of extension 100 begins to ascend toward top opening 94. As the remaining portion of the extension is reduced, the wire being drawn toward implement 99 nears the first transfer control tab (see FIG. 4). Based on the package orientation of container 10a, tab 163 is in position to be the first tab. However, it must be noted that any of the tabs could be the first tab.

As more wire is drawn into implement 99, all slack is removed from container 10a, and wire moving toward implement 99 reaches first tab 163. The tabs are then supporting final convolution or tab convolution 225 extending about the package axis. At this point, during the take-up of the final convolution, the e-script condition typically begins its formation. However, since the final convolution, which includes a portion of extension 100, is fully supported by the tabs, it cannot fold over itself to form the e-script. As more wire is consumed, the wire is pulled from the tabs one by one starting with tab 163 and then proceeding to tabs 164, then 165, then 166, then 167, then 160, then 161 and lastly 162. However, the entire time in which the wire is pulled from this final convolution, the tabs support the wire such that the remaining wire is either enroute to implement 99 or supported by the remaining tabs in engagement with the wire extension. Once the wire is pulled from tab 162, the e-script phase of the transfer is past, and the welding wire operation pulls its welding wire from container 10b.

Figure 16:
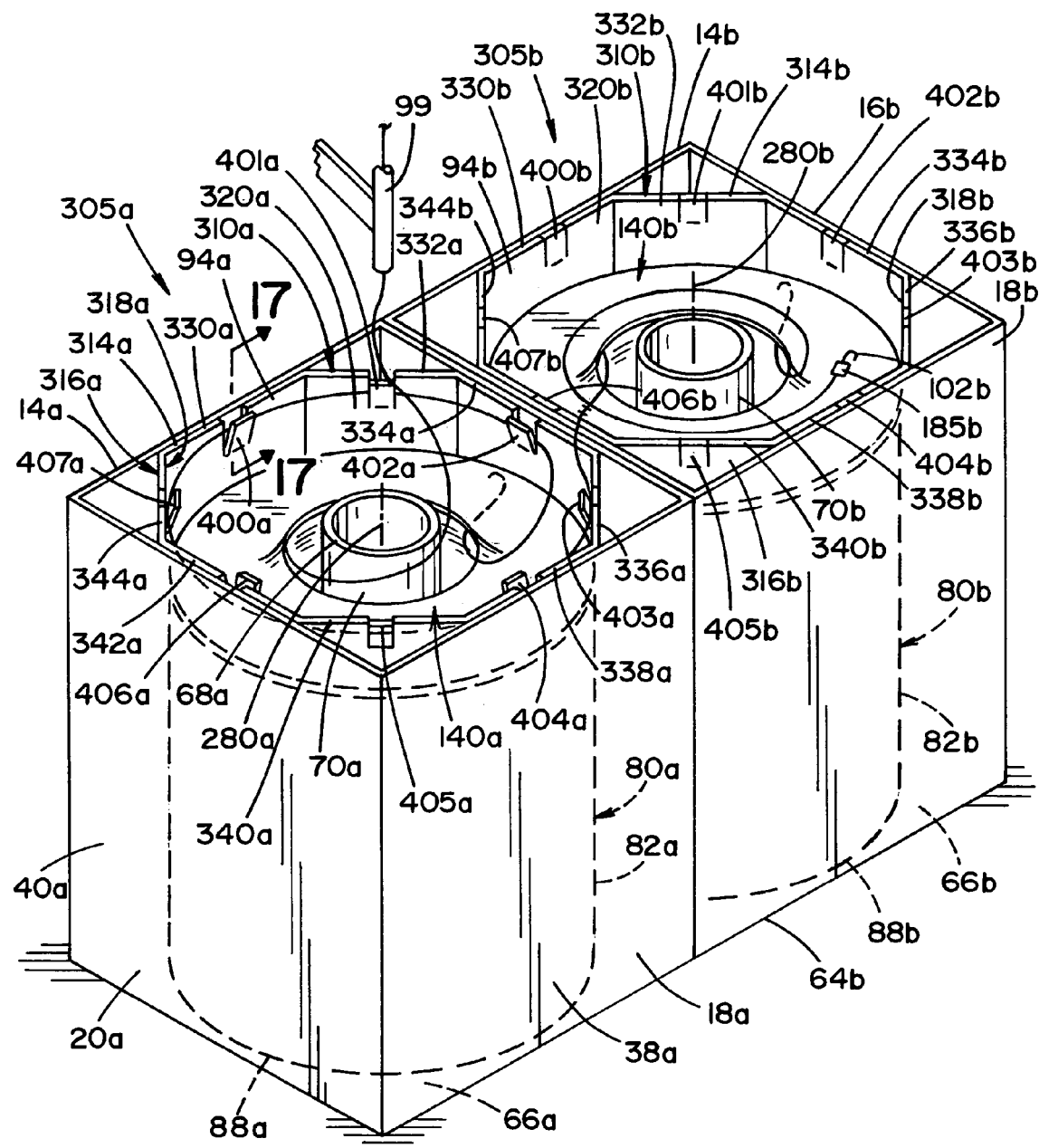
FIG. 16 is a top, side perspective view of a first and a second container according to another embodiment of the present invention with the transfer end wrapped in a counterclockwise manner and with yet another tab design that is slit from a portion of the container.
Figure 17:
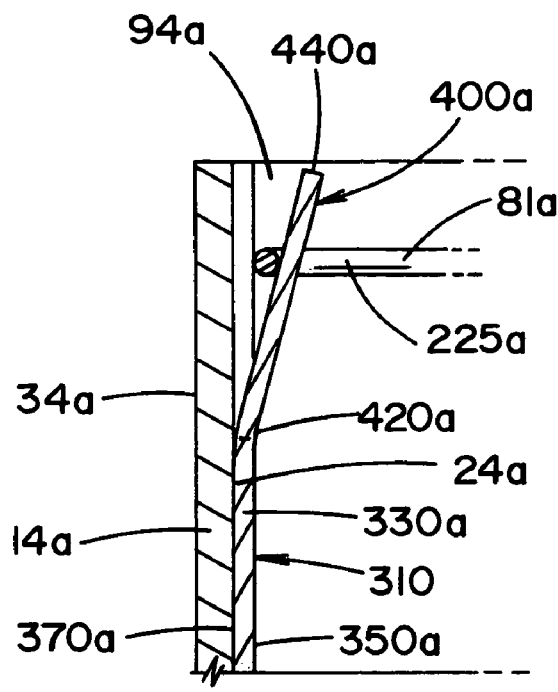
FIG. 17 is an enlarged sectional view taken along lines 17-17 in FIG. 16.
Figure 18:
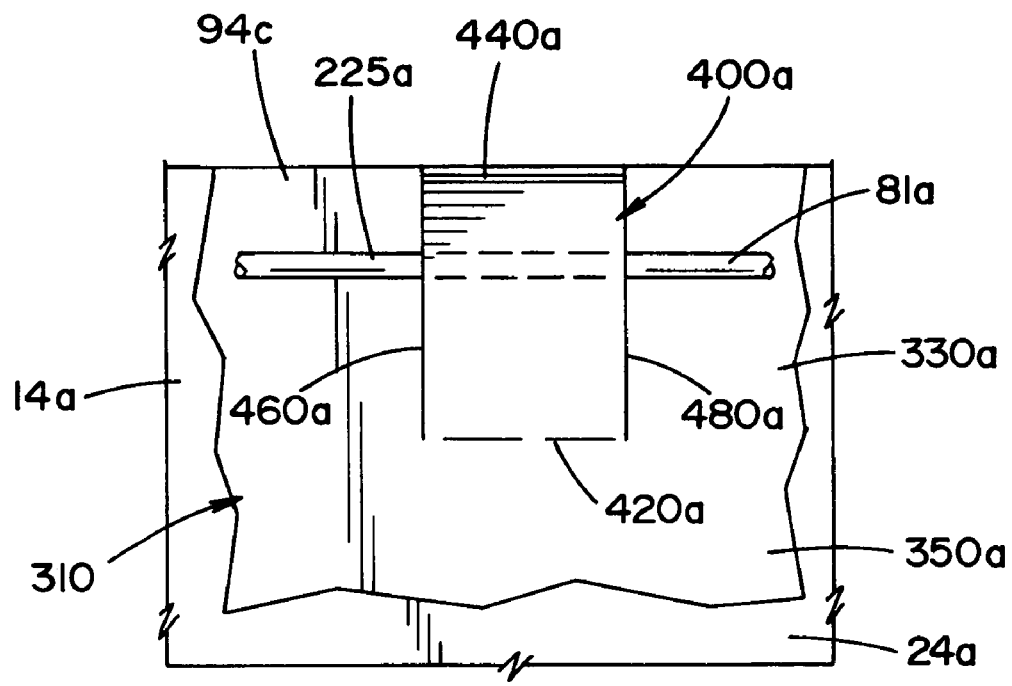
FIG. 18 is an enlarged elevated view of the tab shown in FIG. 17.
Figure 19:
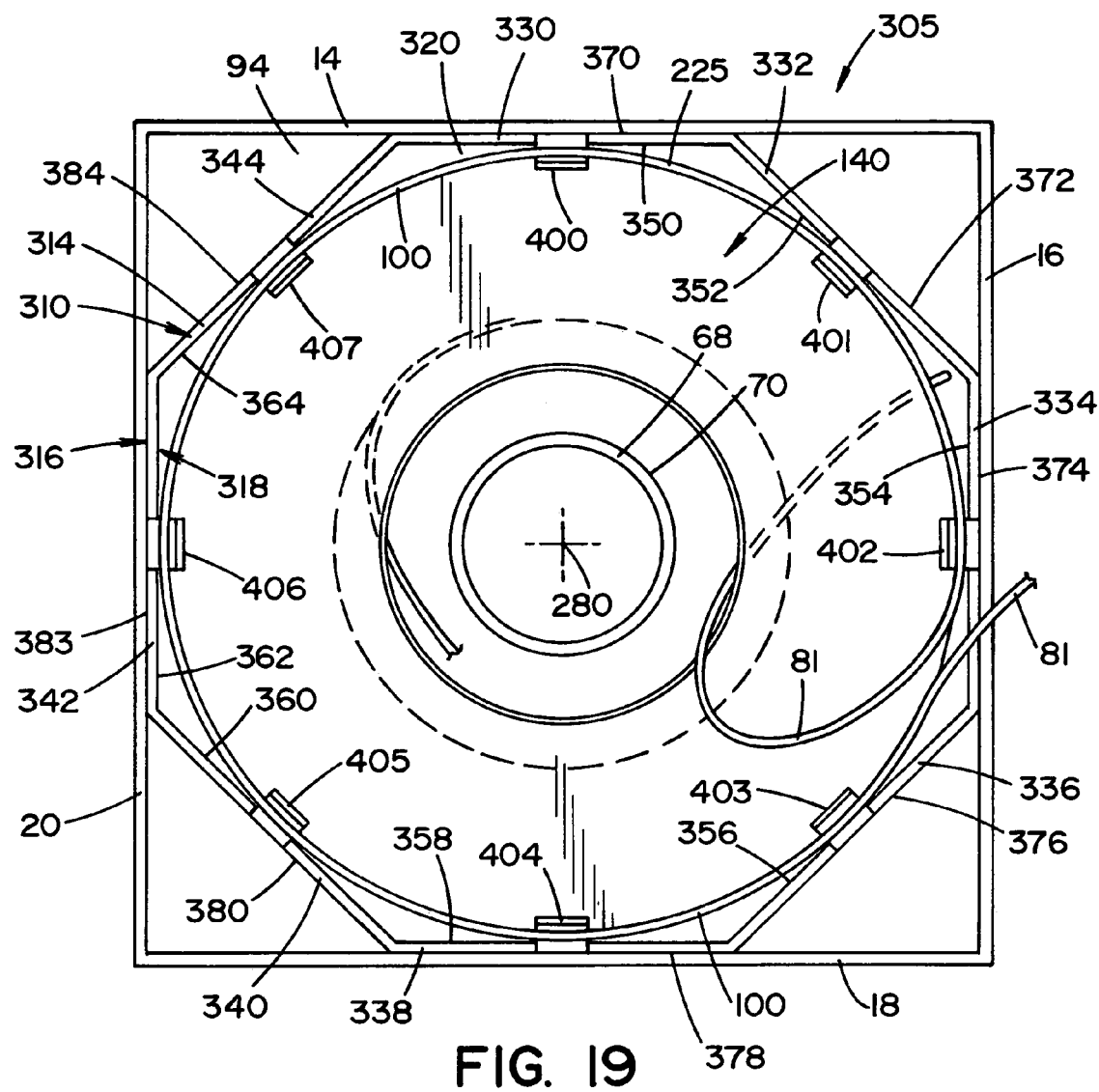
FIG. 19 is an enlarged, top view of one of the containers shown in FIG. 16.

While FIG. 1 shows wire extension 100 being pulled from tabs 160-167 in a clockwise direction about a container axis 280, the wire extension can also be pulled from a counter-clockwise direction, as is shown in FIG. 16, without detracting from the invention of this application. The direction of tab release depends on the how the wire is wrapped or wound into wire coil 80 about axis 280. As can be appreciated, the suspended extension is intended to be the final convolution of wire in the container and it should follow the direction of the other convolutions in the container to minimize the probability of tangling.

Figure 11:
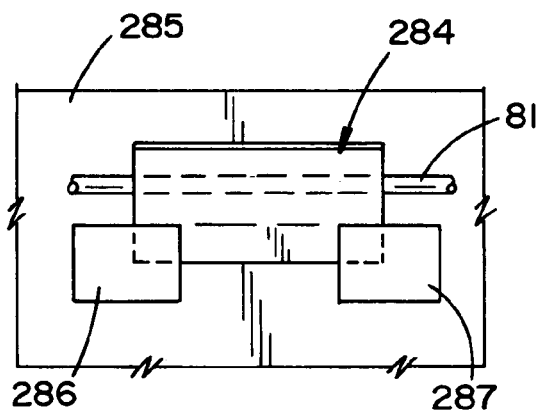
FIG. 11 is an enlarged elevational view of another embodiment of the present invention which includes tabs secured by two strips of a single-sided adhesive material.
Figure 12:
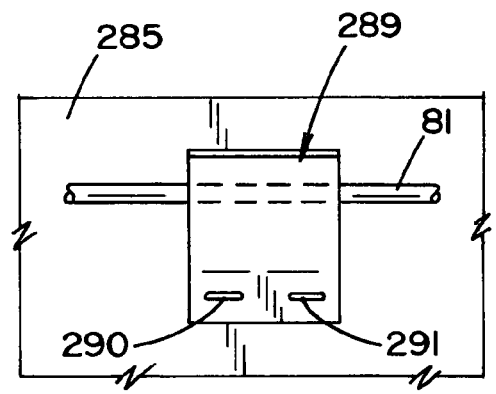
FIG. 12 is an enlarged elevational view of yet another embodiment of the present invention which includes tabs secured by fasteners.
Figure 13:
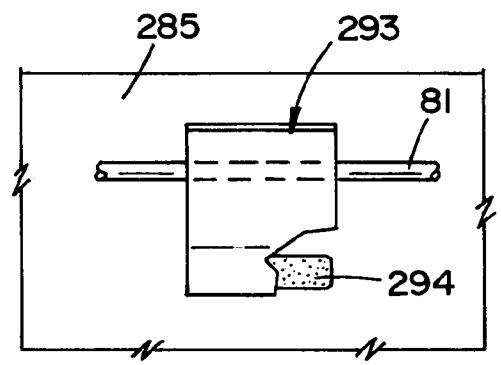
FIG. 13 is an enlarged elevational view of a further embodiment of the present invention which includes tabs secured by an adhesive material.
Figure 14:
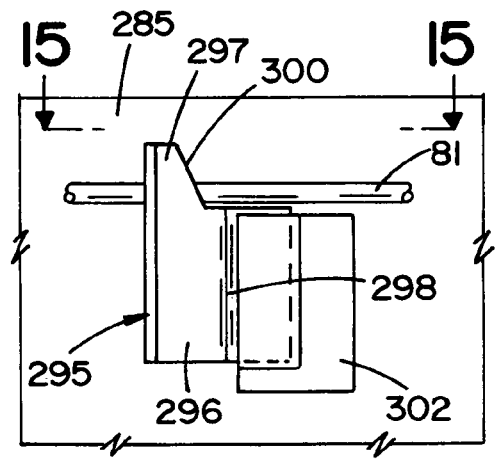
FIG. 14 is an enlarged elevational view of even yet a further embodiment of the present invention which includes tabs with an upward protrusion which are secured by a single-sided adhesive material on a side portion of the tab.
Figure 15:
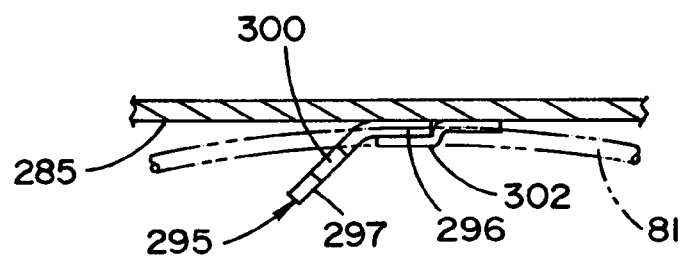
FIG. 15 is an enlarged sectional view taken along lines 15-15 in FIG. 14.

With reference to FIGS. 11-15, shown are a number of examples of how the tabs can be joined to the container. However, any method known in the art could be used to join the tabs to the container. FIG. 11 shows a rectangular tab 284 attached to a container component 285 by two adhesive strips 286 and 287. Such as is shown in FIG. 12, the tabs can also be attached by fasteners. For example, shown is a tab 289 joined to component 285 by two staples 290 and 291. FIG. 13 shows a tab 293 joined by an adhesive 294 to component 285. As can be appreciated, any known adhesive could be used and, further, a double-sided adhesive strip could also be used without detracting from the invention of this application. Even further, any joining technique could be used including, but not limited to, VELCRO brand fastening systems, liquid adhesives, etc. As will be discussed in greater detail below, certain embodiments of this application include tabs designed to be positioned by the end user wherein fastening techniques such as use of VELCRO can be useful. FIG. 14 shows a generally L-shaped tab 295 having a base section 296 and an upward protrusion 297. Base section 296 is flexible about a vertically extending flex line 298, such that upward protrusion 297 is at least partially movable from component 285 such that wire 81 can extend between protrusion 297 and component 285. Protrusion 297 can further include an angled edge 300 to produce a receiving pocket for supporting the wire. An adhesive strip 302, or other methods known in the art, can be used to secure the tab to component 385. As can be seen, tab 295 includes a side-mounted securing arrangement and flexes about a vertical axis, while the other tabs discussed above include bottom mounting arrangements that flex about a horizontal axis. Either arrangement, or combinations thereof, can be used to support the wire about axis 280 to prevent e-script formation. As will be discussed in greater detail below in connection with yet further embodiments, other tab configurations can be used to prevent e-script formation.

In addition, the tabs of this application can be made from any known material in the art including, but not limited to, cardboard, metal strips, polymers, and other engineered materials. Further, in order to aid in the environmentally friendly disposal of the container, the tabs can be made from the same or similar materials as the components of the container in which they are used.

With reference to FIGS. 16-19, yet another tab arrangement is shown. The tabs of this embodiment are formed from a component of the container, which includes the tabs being formed from an inner liner. In this respect, FIGS. 16-19 show containers 305a and 305b which are similar to container 10 above; however, the containers further include a liner 310. As with the discussions above, components of container 305, which are similar to those discussed above with respect to container 10, will be referenced by common reference numbers. Further, while containers 305a and 305b are shown to be the same, that is not a requirement of this application.

Liner 310 is generally coaxial with axis 280 and includes a bottom edge (not shown) and a top edge 314. Liner 310 further includes a radially outward surface 316 and a radially inward surface 318 which in part defines wire cavity 320. Wire cavity 320 is further defined by base sheet 66 and core surface 70 as is described above. Liner 310 can be positioned in container 305 such that the bottom edge rests on base sheet 66 and top edge 314 is at or near top opening 94. Outer surface 316 can be supported directly or indirectly by outer walls 14, 16, 18 and 20. In this respect, while not shown, a vapor barrier can be used with any of the packaging designs of this application. Some vapor barriers are positioned between the liner and the outer wall. As a result, while there is support, the liner may not in direct contact with the outer wall structure. Further, an unsupported liner could be used.

Liner 310 is shown to be a polygonal liner which includes liner walls 330, 332, 334, 336, 338, 340, 342 and 344, which extend from bottom edge 312 to top edge 314 and each liner wall top forms a part of the liner top and bottom. Liner walls 330, 332, 334, 336, 338, 340, 342 and 344 further include inner liner wall surfaces 350, 352, 354, 356, 358, 360, 362 and 364, respectively, and outer liner wall surfaces 370, 372, 374, 376, 378, 380, 382 and 384. Inner surfaces 350, 352, 354, 356, 358, 360, 362 and 364 together form surface 318, and outer surfaces 370, 372, 374, 376, 378, 380, 382 and 384 together form surface 316.

Liner 310 further includes transfer control tabs 400, 401, 402, 403, 404, 405, 406 and 407 positioned in wire cavity 320. As with the embodiment discussed above, tabs 400-407 are all the same tag and, therefore, will be discussed with respect to tab 400, and this discussion applies to tabs 400-407. In this respect, and with reference to FIGS. 17 and 18, tab 400 has a tab base 420 and top edges 440. Tab 400 includes a first side edges 460 and a second side edge 480. The side edges can extend from the respective bases to the respect top edges of each tab. Tabs 400-407 are slit from liner 310 and include virtually no slit width which creates greater resistance to bending or flexing about horizontal base or fold line 420. Again, as will be discussed in greater detail below, the tabs can have other configurations not shown in reference to the figures of this particular discussion. Further, more than one tab configuration can be used in a single container.

The positioning of tabs 400-407 is as follows: tab 400 is formed from liner wall 330, tab 401 is formed from liner wall 332, tab 402 is formed from liner wall 334, tab 403 is formed from liner wall 336, tab 404 is formed from liner wall 338, tab 405 is formed from liner wall 340, tab 406 is formed from liner wall 342, and tab 407 is formed from liner wall 444. Further, while the drawings include tabs on all eight liner walls, less than eight tabs can be used without detracting from the invention of this application. As can be appreciated, increasing the number of support tabs can increase the control of the final convolution or extension 100 by creating more points of engagement. As will be discussed in greater detail below, the tab configuration can also be used for adjusting control. This adjustment can be for addressing different wire diameters and wire compositions.

Tabs 400-407 can be configured similar to tabs 160-167 and can function like these tabs. The difference in the respective tabs is the positioning of the tabs on an inner liner and the formation of the tabs from the liner. While not shown, liner 310 can also be a partial liner, a square liner or other liners with different cross-sectional configurations without detracting from the invention of this application. In addition, the liner arrangement discussed above can include corner supports not shown in this particular embodiment.

While the embodiments discussed above include a tab on each of the eight sides of the cavity of the respective container, eight tabs are not necessary for the invention of this application. Less than eight tabs could be utilized without detracting from the invention of this application. For example, the tabs could be attached or formed from only the corner supports or only the sidewalls of the container or any combination thereof, just as long as the wire is sufficiently supported to prevent the formation of the e-script. Again, while the figures of this application show all tabs extending about the package to be the same tab configuration, which will be discussed in greater detail below, the tabs do not need to all be the same. One or more tab configurations and/or mounting arrangements can be used in a single package. In this respect, and for example only, the first or the last tab could have a special configuration, different from other tabs, that is specially designed for the different wire movement about these tabs. As can be appreciated, the first tab to be released (shown above as tab 163a or 402a) is the primary holder of the wire in the tab loop as the final convolutions of wire are being removed from cavity 72 and as the last convolution of wire is lifted from the cavity. This can result in tab 163 be subjected to uneven loads in both magnitude and direction. Then once all but the tab convolution has been consumed and the wire is pulled from the first tab, the release of the remaining tabs is more uniform and controlled. In addition, the position of wire guide 99, or other factors, could have an effect on the desired tab configuration. For example, a wire guide positioned near side 14 could necessitate the tabs on one side of the package being different than the tabs on the other side of the package. As can be appreciated, the wire manufacturer does not always have control on how the end user utilizes the wire. Accordingly, in one embodiment, the container can be sold without the tabs attached to the container, such that the end user can utilize the desired tab configuration and/or arrangement based on the end user's welding arrangement. This can include a package of a selected group of tabs sold with the container that include fastening arrangements such as, but not limited to, self-adhesive tabs, to attach the tabs to the container.

In addition, as will also be discussed below, other packaging configurations can utilize the tabs of this application. This includes, but is not limited to, packaging configurations with an outer octagonal configuration and packages with other outer cross-sectional configurations.

With reference to FIGS. 20-34, shown are several tab configurations that can be utilized. As can be appreciated, different wire can have different mechanical properties that require different tab properties. For example, smaller diameter wires will produce a different amount of downward force on the tabs than larger diameter wires, due to the differences in the weight per length of the wire. The same can be true for different material compositions that can have different densities and different levels of "memory." In addition, different wire can have different tensile strengths. As a result, changes in the tab configuration and size can be used to make any needed modifications to the support by the tab and the release force produced by the tab as the wire is pulled from the tab.

FIGS. 20 and 21 show rectangular tabs 500 and 502, respectively, that are slit from container component 504. Tab 500 has a base width 510 that is greater than a base width 512 of tab 502. As a result, tab 500 can support a greater weight and can produce a higher release force than tab 502. In addition, tabs 500 and 502 include slits having a width which also influences the properties of the tab. In this respect, tab 500 includes slits 514 and 516 that have a width 518, such that there is no frictional engagement between the side edges of tab 500 and component 504 as tab 500 flexes about its base. By including slits with a width, as opposed to the slits of tabs 400-407 which have no or minimal width, tab 500 can be more flexible than tabs 400-407 discussed above. Similarly, tab 502 has slits 520 and 522 having a width 524.

FIG. 22 shows a tab 530 which includes an arcuate top edge 532 extending upwardly from either end of a base 534. While not shown, tab 530 could also include sidewall portions extending between the ends of base 534 and arcuate edge 532. FIG. 23 shows a tab 540 that is a trapezoidal tab having a top edge 542 that is longer than a base 544. Tab 540 further includes angles side edges 546 and 548 extending from either end of base 544 to top edge 542. FIG. 24 shows a tab 550 also having a top edge 552 that is shorter than a base portion 554. However, tab 550 includes parallel side edges 556 and 558 extending from either end of base 554 and angled edge portions 560 and 562. Angled edge 560 extends between edges 556 and 552, and angled edge 562 extends between edges 558 and 552. By eliminating the corners from the rectangular configuration discussed above, tab 550 can further reduce the likelihood of damaging the welding wire as it is released from the tab. FIG. 25 shows a tab 570 which includes rounded corners. In this respect, tab 570 has a top edge 572 that is shorter than a base portion 574. Tab 570 further includes parallel side edges 576 and 578 extending from either end of base 574. However, tab 570 includes rounded edges 580 and 582. As with the angled edges discussed above, the rounded configuration of tab 570 can also reduce the likelihood of damaging the welding wire as it is released from the tab.

With reference to FIGS. 26 and 27, shown is a tab 590 that is a multi-flap tab. In this respect, tab 590 includes three upwardly extending flap portions 592, 593 and 594, wherein wire 81 extends on one side of flap 593 and on the other side of flaps 592 and 594. Flaps 592-594 are formed from slits 596 and 598. Slits 596 and 598 can be partial slits thereby forming a base section 599. This configuration produces a greater number of flex points in the tab to soften the release of the wire and can be used to space the release point of the wire from the walls of the container. With reference to FIG. 27, tab 590 spaces wire 81 from container portion 504 a distance 600.

Figure 28:
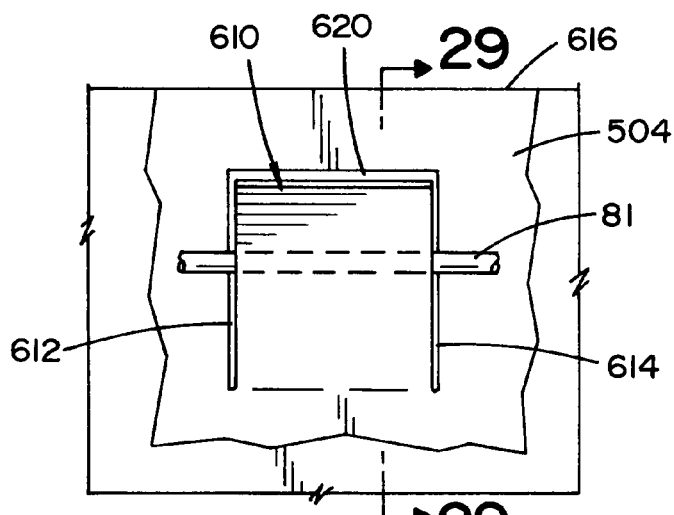
FIG. 28 is an enlarged elevational view of yet a further embodiment of the present invention which includes tabs with a rectangular configuration and a top edge space from the top edge of the container.
Figure 29:
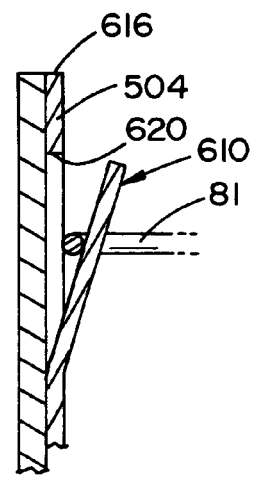
FIG. 29 is an enlarged sectional view taken along lines 29-29 in FIG. 28.

With reference to FIGS. 28 and 29, shown is a tab 610 slit from container component 504, such that side slits 612 and 614 do not extend to a top edge 616 of component 504. Tab 610 is further defined by horizontal slit 620. While tab 610 is shown to be rectangular tab, this slitting arrangement, with a horizontal slit below the top edge of container component 504, can be used with other tab configurations. Further, while slits 612, 614 and 620 are shown to have a width, they can also be slit such that there is no slit width, or even some can have a width and others can have no width. In this respect, and for example only, slits 612 and 614 could be configured to have no width, to decrease the flexibility of the tab, and slit 620 could include a width to help the end user grasps the tab to position the wire within the tab. Again, any of the tabs configurations could include this, or other, slitting arrangements.

Figure 30:
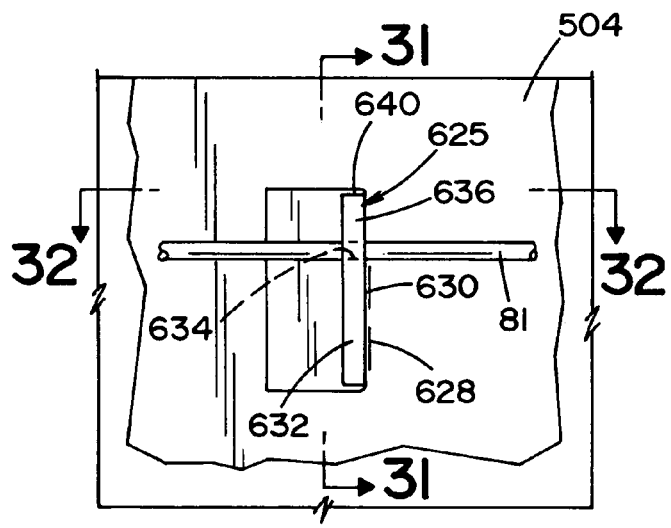
FIG. 30 is an enlarged elevational view of yet another embodiment of the present invention which includes tabs formed from a component of the container that include an inwardly extending member.
Figure 31:
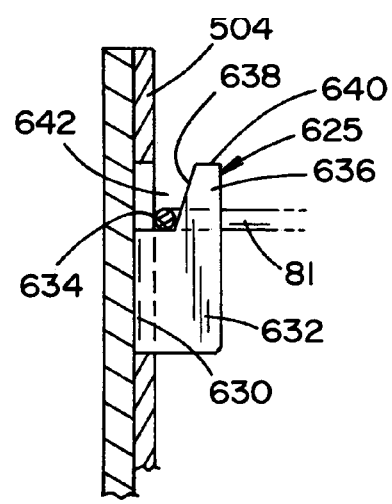
FIG. 31 is an enlarged sectional view taken along lines 31-31 in FIG. 30.
Figure 32:
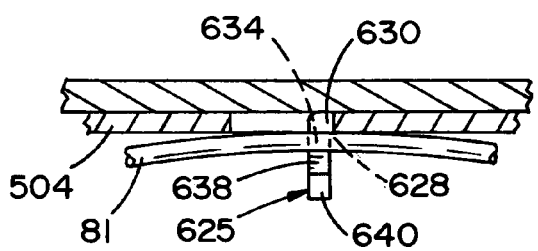
FIG. 32 is an enlarged sectional view taken along lines 32-32 in FIG. 30.

With reference to FIGS. 30-32, shown is a tab 625 which is an example of a tab with a vertically extending flex line 628. In this respect, while many of the embodiments discussed above describe tabs having flex lines that are generally horizontal or parallel to the top of the container, that cannot be considered a requirement for the needed support and release of wire 81. While tab 625 is shown to be slit from component 504, the tab can also be secured to component 504. Tab 625 includes a secured edge 630 at or near flex line 628 which joins the tab to component 504. Tab 625 further includes a base section 632 extending from edge 630 having an upward support edge 634. Tab 625 further includes protrusion 636 extending upwardly from base 632 which includes an outwardly extending support edge 638 extending between support edge 634 and a top 640. Edges 634 and 638 define a wire support pocket 642 for supporting wire 81.

Figure 33:
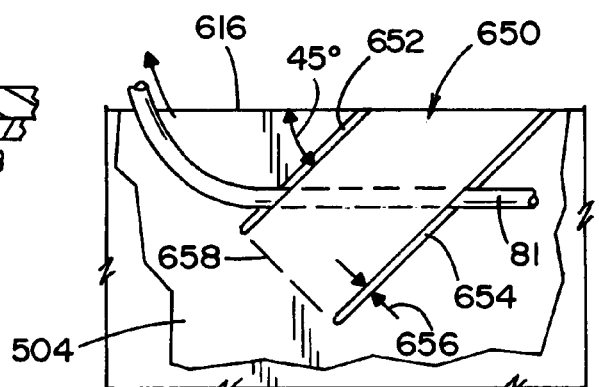
FIG. 33 is an enlarged elevational view of yet a further embodiment of the present invention which includes tabs with a parallel side edges extending at an angle.

With reference to FIG. 33, shown is a tab 650 which also has a flex line that is not parallel to the top of the container. In this respect, tab 650 includes sides edges 652 and 654 that are at an angle from top edge 616 of container component 504. The angle is preferably generally a 45 degree angle from top edge 616, however, it can be in the range of 45 to 50 degrees from edge 616; or 40 to 60 degrees from edge 616; or 25 to 70 degrees from edge 616. Further, tab 650 is shown to be slit from a container component; however, this tab configuration can also be attached to the container, as opposed to slit from the container component. Further, tab 650 is also shown to have slits with a width 656 which is not required. Tab 650 further includes a flex line 658, which is perpendicular to slits 652 and 654 such that slit 654 is longer than slit 652. However, while not shown, slit 652 and 654 could be the same length, even though they are at an angle less than 90 degrees of top edge 616.

With reference to FIGS. 34 and 35, shown is a tab 660 which shows yet another mounting arrangement. In this respect, tab 660 includes a barbed base section 662 having barbs 664 and 665. Tab 660 further includes a locking section 668 and an upper section 670 which includes barbs 672 and 673. While upper section 670 is shown to have a rectangular configuration, the locking arrangements and equivalents thereof, could be used with other tab configurations. Container component 504 includes a tab slot 676, wherein tab 660 is sized to lockingly engage with slot 676 such that locking section 668 is maintained in slot 676 by barbs 664, 665, 672 and 673.

Figure 36:
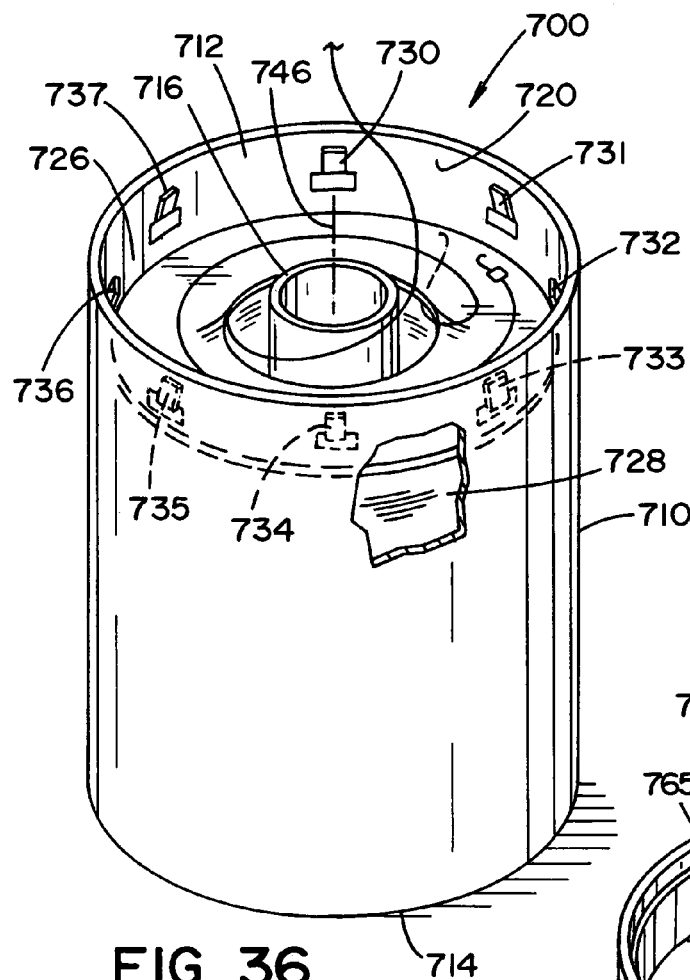
FIG. 36 is a top, side perspective view of a container according to a further embodiment of the present invention with a cylindrical or drum style outer configuration; and, FIG. 37 is a top, side perspective view of a container according to yet another embodiment of the present invention with a cylindrical or drum style configuration and a liner.
Figure 37:
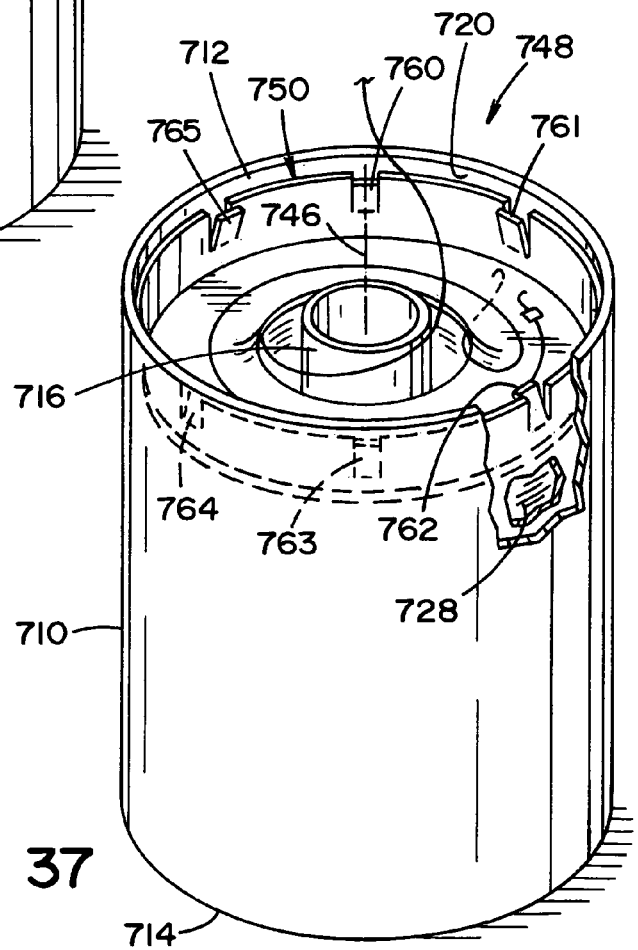

With reference to FIGS. 36 and 37, shown are two drum style containers further showing that the tabs of this application can be used on a wide variety of container designs. More particularly, FIG. 36 shows a container 700 that is a drum style container having a single, cylindrical outer wall 710 forming a round top opening 712. Container 700 further includes a closed bottom 714 and can include an inner core 716. Outer wall 710 includes an inner wall surface 720, and bottom 714 includes an upward surface (not shown). These surfaces together at least partially define a wire receiving cavity 726 for a wire coil 728. Container 700 further includes tabs 730, 731, 732, 733, 734, 735, 736 and 737 circumferentially spaced about vertically extending container axis 746. Tabs 730-737 can be joined directly to wall 710 of container 700, can be formed from wall 710, or can be formed or joined to another container component.

In this respect, FIG. 37 shows a container 748 that includes a liner 750 that is positioned between wire coil 728 and outer wall 710. However container 748 includes tabs 760, 761, 762, 763, 764 and 765 attached to liner 750. While specific tab configurations are shown for containers 700 and 748, any of the tab arrangements described above could be used with these containers. Further, while a specific number of tabs are shown, a different number, either more or less, could be used without detracting from the invention of this application. For example, package 748 only includes six tabs.

While a number of tab configurations or arrangements are shown, these configurations or arrangements are not exhaustive of the configurations of the tabs of this application and equivalents of these tabs are considered a part of this application.

In addition, while not discussed in detail, any of the above embodiments of this invention can include other mechanisms known in the art, such as hold-down mechanisms which are utilized to secure the wire coil during the transport of the containers. Further, additional containers can be combined to this arrangement. Further, vapor barriers can also be used to help protect the welding wire from adverse environments, such as during the transport of the container by ship across the ocean. Furthermore, other wire controlling mechanisms can be used to control the out flowing welding wire from the container beyond those discussed above. Accordingly, as is stated above, while only one packaging design was discussed in relation to the invention of this application, the invention of this application should not be limited to this configuration.

While considerable emphasis has been placed on the preferred embodiments of the invention illustrated and described herein, it will be appreciated that other embodiments and/or equivalents thereof can be made and that many changes can be made in the preferred embodiments without departing from the principals of the invention. Accordingly, it is to be distinctly understood that the foregoing descriptive matter is to be interpreted merely as illustrative of the invention and not as a limitation.

Having thus defined the invention, the following is claimed:

1. A container for packaging and unwinding a coil of welding wire to allow an uninterrupted flow of said welding wire from one said container to another said container, said coil of welding wire including a coiled portion having a top and a bottom, a first extension of said wire extending from said coil near said coil top to a feeding end and a second extension of said wire extending from said coil near said bottom to a transfer end, said transfer end of said one container being joinable to said feeding end of said another container, said container comprising: an outer packaging including at least one vertically extending sidewall, a closed bottom, a top opening for removing said welding wire and a wire coil receiving cavity within said outer packaging for receiving said wire coil, said feeding end and said transfer end being positionable near said top opening; said container further including at least one transfer control tab in said cavity near said top opening, said at least one tab being configured to selectively support said transfer end of said wire during the unwinding of said wire from said coil and to selectively release said transfer end during the transfer from said one container to said another container.

2. The container as defined in claim 1, wherein said at least one control tab includes at least one upwardly opened tab.

3. The container as defined in claim 2, wherein said coil extends about a vertically extending container axis and said at least one control tab includes a plurality of tabs circumferentially space about said axis.

4. The container as defined in claim 3, further including at least one upwardly extending container wall defining a radially outward extent of said wire coil receiving cavity, said plurality of tabs being positioned on said at least one wall.

5. The container as defined in claim 4, wherein said plurality of tabs are formed from said at least one container wall.

6. The container as defined in claim 5, wherein said at least one container wall includes a radially inwardly facing wall surface which engages said coiled portion of said wire, said plurality of tabs each including a radially inwardly facing tab surface and a radially outwardly facing tab surface, said plurality of tabs supporting said wire by the engagement between said wire and said inwardly facing wall surface and said outwardly facing tab surface.

7. The container as defined in claim 6, wherein said each tab is joined to said at least one wall at a tab base, said plurality of tabs being pivotable about said base.

8. The container as defined in claim 7, wherein said each tab further includes vertically extending side edges extending from either side of said base, said side edges formed from slits in said at least one container wall wherein said tab is a portion of said at least one container wall.

9. The container as defined in claim 8, wherein said each tabs further includes a top tab edge opposite to said base edge, said at least one wall including a top wall edge, said top tab edge being near said top wall edge.

10. The container as defined in claim 8, wherein said each tabs further includes a top tab edge opposite to said base edge, said at least one wall including a top wall edge, said top tab edge extending above said top wall edge.

11. The container as defined in claim 8, wherein said each tabs further includes a top tab edge opposite to said base edge, said at least one wall including a top wall edge, said top wall edge extending above said top tab edge.

12. The container as defined in claim 1, further including an inner liner, said inner liner being positioned between said coil and said at least one vertically extending sidewall, said at least one control tab being joined to said liner.

13. The container as defined in claim 12, wherein said liner is an octagonal liner and said at least one control tab is at least four control tabs.

14. The container as defined in claim 13, wherein said at least one control tab is at least seven control tabs.

15. The container as defined in claim 13, wherein said at least one control tab is eight control tabs.

16. The container as defined in claim 13, wherein said at least one control tab includes at least one upwardly opened tab.

17. The container as defined in claim 13, wherein said at least one control tab includes at least one upwardly opened tab.

18. The container as defined in claim 13, wherein said at least one control tab is formed from said liner.

19. The container as defined in claim 13, wherein said coil extends about a vertically extending container axis and said at least one control tab is a plurality of control tabs circumferentially space about said axis.

20. The container as defined in claim 13, wherein said liner includes at least one radially inwardly facing liner surface which engages said coiled portion of said wire, said at least one control tab each including an radially inwardly facing tab surface and a radially outwardly facing tab surface, said at least one control tab supporting said wire by the engagement between said wire and said inwardly facing liner surface and said outwardly facing tab surface.

21. The container as defined in claim 12, wherein said coil extends about a vertically extending container axis and said at least one control tab is a plurality of control tabs circumferentially space about said axis.

22. The container as defined in claim 12, wherein said liner includes at least one radially inwardly facing liner surface which engages said coiled portion of said wire, said at least one control tab each including an radially inwardly facing tab surface and a radially outwardly facing tab surface, said at least one control tab supporting said wire by the engagement between said wire and said inwardly facing liner surface and said outwardly facing tab surface.

23. The container as defined in claim 12, wherein said at least one control tab is formed from said liner.

24. The container as defined in claim 12, wherein each said at least one control tab is joined to said liner at a tab base, said each tab being pivotable about said base.

25. The container as defined in claim 24, wherein said each tab is joined to said liner at a tab base, said each tab being pivotable about said base.

26. The container as defined in claim 25, wherein said each tab further includes vertically extending side edges extending from either side of said base, said side edges formed from slits in said liner wherein said tab is a portion of said liner.

27. The container as defined in claim 26, wherein said each tabs further includes a top tab edge opposite to said base edge, said liner including a liner wall edge, said top tab edge being near said top liner edge.

28. The container as defined in claim 26, wherein said each tabs further includes a top tab edge opposite to said base edge, said liner including a top liner edge, said top tab edge extending above said top liner edge.

29. The container as defined in claim 26, wherein said each tabs further includes a top tab edge opposite to said base edge, said liner including a top liner edge, said top liner edge extending above said top tab edge.

30. The container as defined in claim 25, wherein said each tab further includes vertically extending side edges extending from either side of said base, said side edges formed from slits in said liner wherein said tab is a portion of said liner.

31. The container as defined in claim 12, wherein said at least one control tab is at least four control tabs, said coil extending about a vertical container axis and said liner including at least four vertically extending liner walls generally coaxial with said axis, each said liner wall including one of said at least four control tabs.

32. The container as defined in claim 31, wherein said container has a polygonal cross-sectional configuration and said container further includes a plurality of corner supports between said coil and said at least one vertically extending sidewall, at least one said tab being joined to one of said plurality of corner supports.

33. The container as defined in claim 31, wherein said at least four control tabs are at least four upwardly opened tabs.

34. The container as defined in claim 33, wherein each said at least four control tabs is joined to said liner at a tab base, said each tab being pivotable about said tab base respectively.

35. The container as defined in claim 34, wherein said each tab includes a top tab edge and said liner includes a top liner edge, said top tab edge being near said top liner edge.

36. The container as defined in claim 35, wherein said each tab is formed from said liner.

37. The container as defined in claim 31, wherein said liner includes eight walls generally coaxial with said axis and said at least one control tab is eight control tabs positioned on each of said eight liner walls.

38. The container as defined in claim 1, wherein said at least one vertically extending sidewall is a cylindrical sidewall.

39. The container as defined in claim 38, wherein said cylindrical sidewall includes an radially inner sidewall surface, said at least one transfer control tab being fixed to said inner sidewall surface.

40. The container as defined in claim 39, wherein said cylindrical sidewall further includes an inner cylindrical layer and an outer cylindrical layer, said inner cylindrical layer including said radially inner sidewall surface.

41. The container as defined in claim 40, wherein said at least one transfer control tab is formed from said inner cylindrical layer.

42. The container as defined in claim 41, wherein each said at least one control tab is joined to said liner cylindrical layer at a tab base, said each tab being pivotable about said tab base respectively; said each tab further including a top tab edge opposite to said tab base and said inner cylindrical layer further including a top layer edge; said top tab edge being near said top layer edge.

43. The container as defined in claim 1, wherein said at least one control tab includes a rectangular control tab.

44. The container as defined in claim 1, wherein said at least one control tab includes a trapazoidal control tab.

45. The container as defined in claim 1, wherein said at least one control tab includes an arcuate tab edge.

46. The container as defined in claim 1, wherein said at least one control tab includes a upwardly opened slit.

47. The container as defined in claim 46, wherein said upwardly opened slit has a width greater than the wire diameter of said wire.

48. The container as defined in claim 1, wherein said at least one control tab includes a locking groove, said wire cavity including a radially outward wall having at least one groove receiving opening, said locking grooving being configured to lockingly interengage with said opening.

49. The container as defined in claim 1, wherein said at least one control tab is a plurality of tabs including at least one tab from a first group of tabs and at least one tab from a second group of tabs, said first group of tabs having a first tab configuration and said second group of tabs having a second tab configuration, said first tab configuration being different than said second tab configuration.

50. A container for packaging and unwinding a coil of welding wire to allow an uninterrupted flow of said welding wire from one said container to another said container, said coil of welding wire including a coiled portion having a top and a bottom, a first extension of said wire extending from said coil near said coil top to a feeding end and a second extension of said wire extending from said coil near said bottom to a transfer end, said transfer end of said one container being joinable to said feeding end of said another container, said container comprising: an outer packaging including at least one vertically extending side wall, a closed bottom, a top opening for removing said welding wire, said feeding end and said transfer end being positionable near said top opening, said container further including a liner having a radially inner surface partially defining a wire coil receiving cavity within said outer packaging for receiving said wire coil, said liner extending vertically between said closed bottom and said top opening and including at least one transfer control tab near said top opening, said at least one tab being an upwardly opened flap.

51. The container as defined in claim 50, wherein said each tab is formed from said liner.

52. A container for packaging and unwinding a coil of welding wire to allow an uninterrupted flow of said welding wire from one said container to another said container, said coil of welding wire including a coiled portion having a top and a bottom, a first extension of said wire extending from said coil near said coil top to a feeding end and a second extension of said wire extending from said coil near said bottom to a transfer end, said transfer end of said one container being joinable to said feeding end of said another container, said container comprising: a square outer packaging including four vertically extending side walls having a top and a bottom edge, a closed bottom adjacent said bottom edges, a top opening adjacent said top edges for removing said welding wire, said feeding end and said transfer end being positionable near said top opening, said container further including a liner having eight vertically extending liner sheets that are sized to fit within said four vertically extending side walls, said eight liner sheets having radially inner surfaces partially defining a wire coil receiving cavity, said container further including a plurality of transfer control tabs on said liner near said top opening, each of said plurality of tabs being positioned on a different said liner sheet.

53. The container as defined in claim 52, wherein said plurality of control tabs is at least four control tabs.

54. The container as defined in claim 52, wherein said plurality of control tabs is at least seven control tabs.

55. The container as defined in claim 52, wherein said plurality of control tabs includes eight control tabs.

56. The container as defined in claim 52, wherein said plurality of control tabs are formed from said liner.

57. A container for packaging and unwinding a coil of welding wire to allow an uninterrupted flow of said welding wire from one said container to another said container, said coil of welding wire including a coiled portion having a top and a bottom, a first extension of said wire extending from said coil near said coil top to a feeding end and a second extension of said wire extending from said coil near said bottom to a transfer end, said transfer end of said one container being joinable to said feeding end of said another container, said container comprising: an outer packaging including at least one vertically extending side wall, a closed bottom, a top opening for removing said welding wire and a wire coil receiving cavity within said outer packaging for receiving said wire coil, said feeding end and said transfer end being positionable near said top opening; said container further including a plurality of transfer control tabs that are selectively securable to a portion of said cavity such that said container can be transformed into an endless wire container, said plurality of control tabs be selectively securable to said cavity near said top opening and being configured to selectively support said transfer end of said wire during the unwinding of said wire from said coil and to selectively release said transfer end during the transfer from said one container to said another container when secured to said cavity.

58. The container as defined in claim 57, wherein said plurality of control tabs is a plurality of self-adhesive control tabs packaged in said container.

59. A method of joining a container for packaging and unwinding a coil of welding wire with another said container of welding wire to allow an uninterrupted flow of said welding wire from said one container to said another container, said method including the steps of:

providing said container comprising said coil of welding wire including a coiled portion having a top and a bottom, a first extension of said wire extending from said coil near said coil top to a feeding end and a second extension of said wire extending from said coil near said bottom to a transfer end; an outer packaging having a top opening and a wire coil receiving cavity within said outer packaging for receiving said wire coil, said feeding end and said transfer end being positionable near said top opening;

providing at least one transfer control tab in said cavity near said top opening, said at least one tab being configured to selectively support said transfer end of said wire during the unwinding of said wire from said coil and to selectively release said transfer end during the transfer from said one container to said another container;

providing said another container comprising another said coil of welding wire including another coiled portion having a top and a bottom, a first extension of said wire extending from said another coil near said coil top to a feeding end and a second extension of said wire extending from said another coil near said bottom to a transfer end; another outer packaging having a top opening and a wire coil receiving cavity within said another outer packaging for receiving said another wire coil, said feeding end and said transfer end being positionable near said top opening;

positioning said another container next to said container;

joining said feeding end of said another container to said transfer end of said container to form a continuous wire extension between said coil in said container and said another coil in said another container; and, positioning said transfer end of said wire in said at least one transfer control tab.

60. The method as defined in claim 59, wherein said positioning step is before said joining step.

61. The method as defined in claim 59, wherein said container further includes a liner and each said at least one control tab is joined to said liner at a tab base, said each tab being pivotable about said base.

62. The method as defined in claim 61, wherein said at least one tab is formed from said liner and said method further including the step of slitting said liner such that each said at least one tab includes vertically extending side edges extending from either side of said base.

63. The method as defined in claim 62, wherein said each tabs further includes a top tab edge opposite to said base edge, said liner including a liner wall edge, said top tab edge being near said top liner edge.

64. The method as defined in claim 62, wherein said each tabs further includes a top tab edge opposite to said base edge, said liner including a top liner edge, said top tab edge extending above said top liner edge.

65. The method as defined in claim 62, wherein said each tabs further includes a top tab edge opposite to said base edge, said liner including a top liner edge, said top liner edge extending above said top tab edge.

66. The method as defined in claim 59, wherein said providing at least one transfer control tab in said cavity includes packaging a plurality of said at least one control tabs in said container and securing said plurality of tabs after the package is opened by an end user of said container, said end user securing said plurality of tabs near said top opening.

* * * * *